(12) United States Patent
Yamamoto

(10) Patent No.: US 8,665,408 B2
(45) Date of Patent: Mar. 4, 2014

(54) LIQUID CRYSTAL DISPLAY DEVICE

(75) Inventor: Kaoru Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/992,523

(22) PCT Filed: Dec. 1, 2011

(86) PCT No.: PCT/JP2011/077808
§ 371 (c)(1),
(2), (4) Date: Jun. 7, 2013

(87) PCT Pub. No.: WO2012/077570
PCT Pub. Date: Jun. 14, 2012

(65) Prior Publication Data
US 2013/0258225 A1  Oct. 3, 2013

(30) Foreign Application Priority Data

Dec. 10, 2010  (JP) ................................ 2010-276060

(51) Int. Cl.
*G02F 1/1345* (2006.01)
(52) U.S. Cl.
USPC ........................................... 349/152; 345/87
(58) Field of Classification Search
None
See application file for complete search history.

(56) References Cited

U.S. PATENT DOCUMENTS

| 4,818,981 | A | 4/1989 | Oki et al. | |
|---|---|---|---|---|
| 6,433,765 | B1 | 8/2002 | Fujiwara et al. | |
| 7,295,196 | B2 * | 11/2007 | Kim et al. | 345/206 |
| 7,355,669 | B2 * | 4/2008 | Onda et al. | 349/156 |
| 2002/0171797 | A1 | 11/2002 | Ichioka et al. | |
| 2010/0134735 | A1 * | 6/2010 | Nakamura et al. | 349/116 |

FOREIGN PATENT DOCUMENTS

| JP | 63-068818 A | 3/1988 |
|---|---|---|
| JP | 05-341263 A | 12/1993 |
| JP | 2001-051254 A | 2/2001 |
| JP | 2002-333639 A | 11/2002 |

OTHER PUBLICATIONS

English translation of Official Communication issued in corresponding International Application PCT/JP2011/077808, mailed on Jun. 20, 2013.
Official Communication issued in International Patent Application No. PCT/JP2011/077808, mailed on Jan. 31, 2012.

* cited by examiner

*Primary Examiner* — Lucy Chien
(74) *Attorney, Agent, or Firm* — Keating & Bennett, LLP

(57) ABSTRACT

A liquid crystal display device (100) according to the present invention includes a first substrate (10) including pixel electrodes (11), gate lines (G) and switching elements (12), a second substrate (20) including a plurality of signal electrodes (21) which are electrically independent of each other, and a liquid crystal layer (30) interposed between the first and second substrates. The first substrate further includes a gate driver (15) which generates gate signals to be supplied to the gate lines. The second substrate further includes an external connecting terminal section (24). A signal that has been input through the external connecting terminal section is supplied to the gate driver. The present invention provides a liquid crystal display device with a counter source structure which contributes to narrowing its frame area.

17 Claims, 12 Drawing Sheets

(a)

(b)

(a)

(b)

(a)

(b)

(a)

(b)

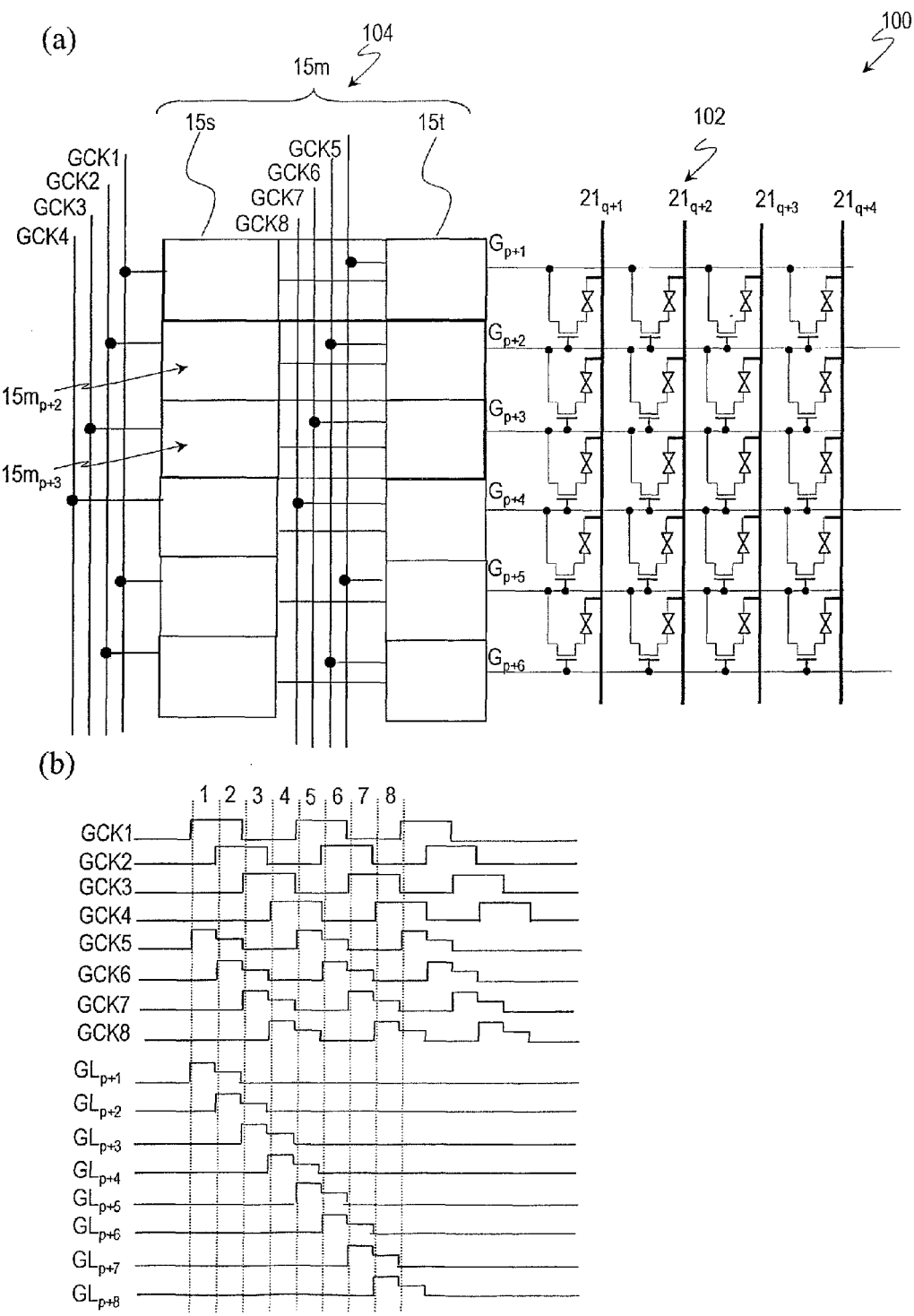

LIQUID CRYSTAL DISPLAY DEVICE

TECHNICAL FIELD

The present invention relates to a liquid crystal display device.

BACKGROUND ART

Liquid crystal display devices have a number of advantages, including their lighter weight, reduced depth and smaller power dissipation, over various other kinds of display devices, and have been used as a display device with a small screen such as a monitor for a cellphone as well as a big screen for a TV set. And even now, people are making every effort to further reduce their power dissipation and further cut down their size, particularly in their frame area.

A liquid crystal display device currently used generally includes one substrate with gate lines, source lines, pixel electrodes and switching elements and the other substrate with a counter electrode which faces all of those pixel electrodes in common. Such a liquid crystal display device typically displays a predetermined grayscale by controlling the transmittance of its liquid crystal layer with the potential of a pixel electrode changed with respect to a constant potential of the counter electrode.

Meanwhile, known as another type of liquid crystal display device is a device which includes pixel electrodes, switching elements and gate lines on one substrate and striped signal electrodes (data lines), instead of the counter electrode, on the other substrate (see Patent Document No. 1, for example). Such a liquid crystal display device typically conducts a display operation at an appropriate grayscale level by changing the potential of a signal electrode which is arranged on the other substrate separately from the substrate with the pixel electrodes. Such a configuration is called either a "counter source structure" or a "counter matrix structure". In the counter source structure, the signal electrodes are arranged on the counter substrate, not the active-matrix substrate, and therefore, short circuit of source and gate lines and a signal delay due to a parasitic capacitance can be reduced on the active-matrix substrate. In the liquid crystal display device disclosed in Patent Document No. 1, each switching element has its source connected to an adjacent gate line and each gate signal is changed between three levels, thereby setting the potential at a pixel electrode to be a reference potential level during a write operation and getting the write operation done appropriately.

CITATION LIST

Patent Literature

Patent Document No. 1: Japanese Laid-Open Patent Publication No. 63-68818

SUMMARY OF INVENTION

Technical Problem

The present inventor discovered that a liquid crystal display device simply having such a counter source structure could not reduce the frame area.

The present inventor perfected our invention to overcome such a problem by providing a liquid crystal display device which is specially designed to reduce the frame area effectively.

Solution to Problem

A liquid crystal display device according to the present invention includes: a first substrate which includes: a plurality of pixel electrodes that are arranged in rows and columns to form a matrix pattern; a plurality of gate lines, each of which runs in a row direction; and a plurality of switching elements, each of which includes a gate, a source and a drain, each of the plurality of switching elements having its drain electrically connected to an associated one of the pixel electrodes and its gate electrically connected to an associated one of the gate lines, each set of the switching elements that are arranged in the row direction having their sources electrically connected together; a second substrate including a plurality of signal electrodes which are electrically independent of each other; and a liquid crystal layer which is interposed between the first and second substrates. The first substrate further includes a gate driver which generates gate signals to be supplied to the gate lines. The second substrate further includes an external connecting terminal section. A signal that has been input through the external connecting terminal section is supplied to the gate driver.

In one embodiment, the gate driver generates gate signals, of which the level changes from one of low, middle and high levels into another, and wherein each of the plurality of switching elements has its source electrically connected to another gate line, not its associated gate line.

In one embodiment, each of the plurality of switching elements has its source electrically connected to a gate line which is adjacent to its associated gate line.

In one embodiment, the second substrate further includes a source driver which supplies a video signal to the signal electrodes.

In one embodiment, the first substrate has a display area and a frame area which surrounds the display area, and the gate driver includes first and second gate drivers which are respectively arranged in first and second areas of the frame area that are located on two opposite sides of the display area in the row direction.

In one embodiment, the gate driver includes a plurality of gate driver modules which generate respective gate signals to be supplied to the plurality of gate lines.

In one embodiment, each of the plurality of gate driver modules includes: a stage section, to/from which a signal is input or output from/to an adjacent one of the gate driver modules; and a buffer section.

In one embodiment, the stage section includes a bootstrap capacitor, and the stage section outputs a signal to the buffer section through a line which is connected to the bootstrap capacitor.

In one embodiment, the gate driver generates gate signals in response to a plurality of gate clock signals, and the gate driver outputs some of the gate clock signals as the gate signals during a predetermined period.

In one embodiment, the plurality of gate clock signals include: a first gate clock signal which inverts its level every two horizontal scanning periods; a second gate clock signal of which the phase has shifted by one horizontal scanning period with respect to the first gate clock signal; a third gate clock signal of which the phase has shifted by one horizontal scanning period with respect to the second gate clock signal; a fourth gate clock signal of which the phase has shifted by one horizontal scanning period with respect to the third gate clock signal; a fifth gate clock signal which repeats the same series of level changes from one of low, middle and high levels into another in a predetermined order every four horizontal scanning periods; a sixth gate clock signal of which the phase has shifted by one horizontal scanning period with respect to the fifth gate clock signal; a seventh gate clock signal of which the phase has shifted by one horizontal scanning period with respect to the sixth gate clock signal; and an eighth gate clock signal of which the phase has shifted by one horizontal scanning period with respect to the seventh gate clock signal.

In one embodiment, the first gate clock signal rises synchronously with the fifth gate clock signal.

In one embodiment, before the fifth gate clock signal rises from the middle level to the high level, the sixth gate clock signal rises from the low level to the middle level.

In one embodiment, after the fifth gate clock signal has fallen from the high level to the low level, the sixth gate clock signal rises from the middle level to the high level.

In one embodiment, in each of the fifth, sixth, seventh and eighth gate clock signals, the potential difference between the high and middle levels is greater than the sum of a maximum potential difference of the signal electrodes and a threshold voltage of the switching elements.

In one embodiment, in each of the fifth, sixth, seventh and eighth gate clock signals, the potential difference between the middle and low levels is greater than the difference between a maximum potential difference of the signal electrodes and a threshold voltage of the switching elements.

In one embodiment, each of the fifth, sixth, seventh and eighth gate clock signals changes their level in the order of low, middle and high levels.

In one embodiment, each of the fifth, sixth, seventh and eighth gate clock signals changes their level in the order of low, high and middle levels.

Advantageous Effects of Invention

The present invention provides a liquid crystal display device which contributes to narrowing the frame area.

BRIEF DESCRIPTION OF DRAWINGS

FIG. 13 (a) illustrates an equivalent circuit of a liquid crystal display device as a sixth embodiment of the present invention and (b) illustrates the waveforms of gate clock signals and gate signals for use in the liquid crystal display device of the sixth embodiment.

DESCRIPTION OF EMBODIMENTS

Hereinafter, embodiments of a liquid crystal display device according to the present invention will be described with reference to the accompanying drawings. It should be noted, however, that the present invention is in no way limited to the embodiments to be described below.

Embodiment 1

Figure 1:
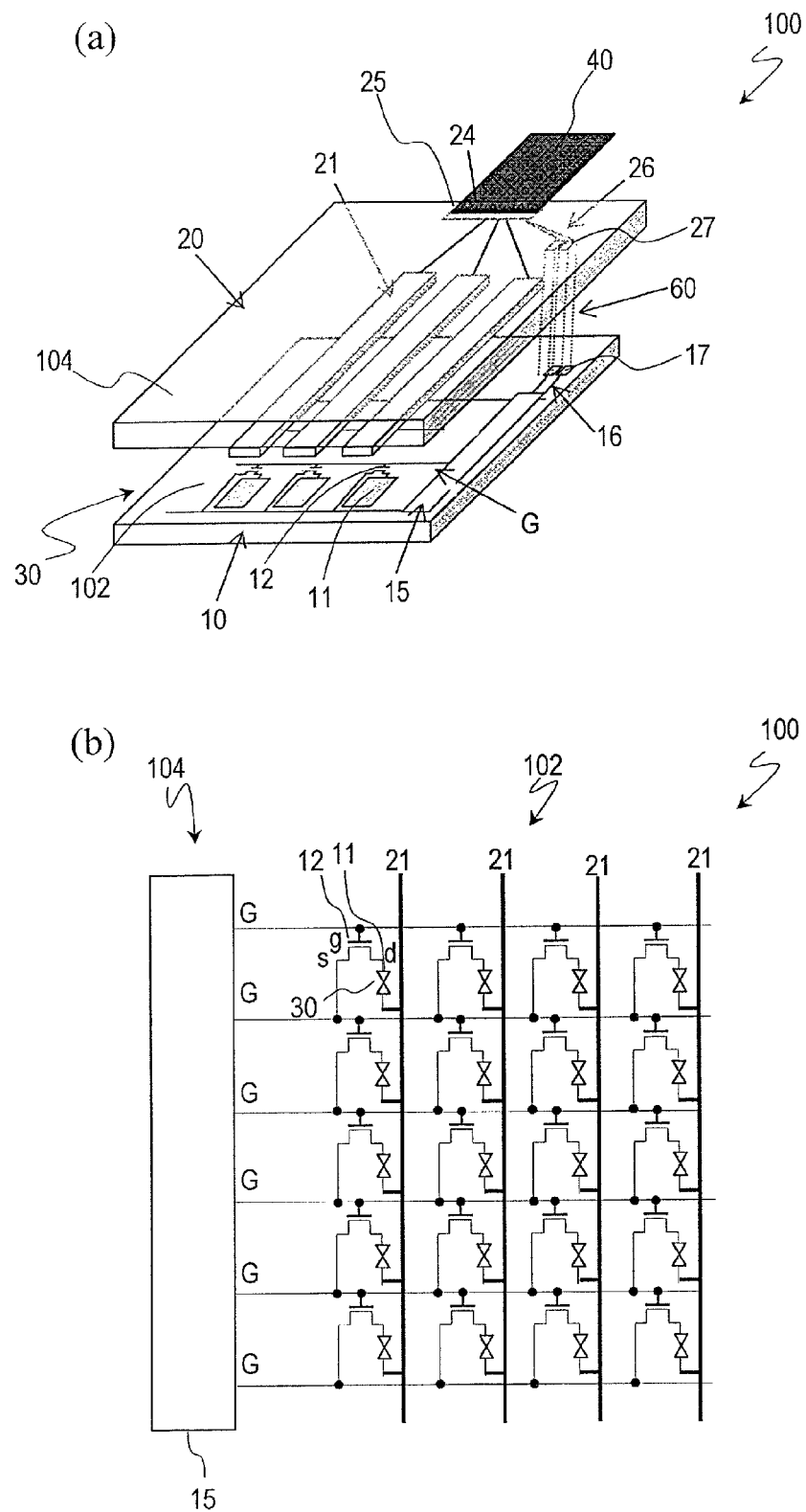
FIG. 1 (a) is a schematic perspective view illustrating a liquid crystal display device as a first embodiment of the present invention, and (b) is an equivalent circuit diagram of the liquid crystal display device of the first embodiment.

First of all, a first embodiment of a liquid crystal display device according to the present invention will be described. FIG. 1(a) is a schematic perspective view illustrating a liquid crystal display device 100 according to this first embodiment, and FIG. 1(b) illustrates an equivalent circuit of the liquid crystal display device 100.

The liquid crystal display device 100 of this embodiment includes a substrate 10, another substrate 20, and a liquid crystal layer 30 which is interposed between the substrates 10 and 20. The substrate 10 includes gate lines G, pixel electrodes 11 and switching elements 12, as which thin-film transistors (TFTs) may be used, for example. The substrate 10 is sometimes called an "active-matrix substrate" or a "TFT substrate", and the substrate 20 is sometimes called a "counter substrate". In this description, the substrates 10 and 20 will be sometimes referred to herein as a "first substrate 10" and a "second substrate 20", respectively.

The pixel electrodes 11 are arranged in columns and rows to form a matrix pattern. Each of the gate lines G runs in the row direction. Each of the switching elements 12 includes a gate g, a source s and a drain d, and has its drain d electrically connected to an associated one of the pixel electrodes 11 and its gate g electrically connected to an associated one of the gate lines G. Each set of the switching elements 12 that are arranged in the row direction have their sources s electrically connected together. That is why the potentials of the respective sources s of the switching element 12 on the same row are equal to each other. However, the potentials of the respective sources s of the switching elements 12 on different rows may not be equal to each other. In this example, the source s of each switching element 12 is electrically connected to a gate line G which is adjacent to the gate line G associated with the gate g of that switching element 12.

Each TFT 12 has an MIS or MOS structure including a semiconductor layer, which may be an amorphous semiconductor layer, a polycrystalline semiconductor layer or an oxide semiconductor layer. For example, the semiconductor layer may include IGZO (InGaZnOx). In that case, the leakage current can be reduced, the drivability can be increased, and high speed driving is realized with storage capacitor lines omitted. Alternatively, the semiconductor layer may include amorphous silicon or polysilicon. Furthermore, each TFT 12 may have a bottom gate structure or a top gate structure.

The substrate 20 includes a plurality of signal electrodes 21 which are electrically independent of each other. In this liquid crystal display device 100, the signal electrodes 21 run in the column direction so as to cross the gate lines G at substantially right angles. At least some of the signal electrodes 21 are arranged so as to face the pixel electrodes 11 that are arranged in the column direction. For example, each signal electrode 21 may have a substantially constant width and may run in the column direction so as to face a plurality of pixel electrodes 11. Alternatively, each signal electrode 21 may also include a line portion and a plurality of electrode portions which are connected to the line portion and which face the pixel electrodes 11 that are arranged in the column direction. A video signal corresponding to a grayscale voltage is supplied to each signal electrode 21. The signal electrode 21 and the video signal are also called a "source electrode" and a "source signal".

The liquid crystal layer 30 may operate in the VA (vertical alignment) mode, the TN (twisted nematic) mode, or the OCB (optically compensated bend) mode. Alternatively, the liquid crystal layer 30 may also operate in the IPS (in-plane switching) mode or the FFS (fringe field switching) mode. Also, the liquid crystal display device 100 may be a transmissive type, a reflective type or a transflective type.

The liquid crystal display device 100 has a display area 102 and a frame area 104 which surrounds the display area 102. The pixel electrodes 11, the TFTs 12 and the signal electrodes 21 are arranged in the display area 102.

In this liquid crystal display device 100, the substrate 10 further includes a gate driver 15, while the substrate 20 further includes an external connecting terminal section 24 and a source driver 25. An input board 40 is implemented on the external connecting terminal section 24. As the input board 40, a flexible printed circuits (FPC) board may be used, for example.

The source driver 25 may be implemented on a glass substrate, for example, and may be an integrated circuit (IC). In accordance with a signal that has been input through the input board 40 and the external connecting terminal section 24, the source driver 25 generates a video signal to be supplied to the signal electrodes 21.

The gate driver 15 generates gate signals to be supplied to the gate lines G. In the liquid crystal display device 100 of this embodiment, the signal that has been input through the external connecting terminal section 24 is supplied to the gate driver 15. More specifically, in the frame area 104 of the liquid crystal display device 100, arranged is a contact portion 60 which electrically connects together terminal portions 17 and 27 of the substrates 10 and 20. A line 26 which electrically connects the terminal portion 27 to the external connecting terminal section 24 is arranged on the substrate 20. And a line 16 which electrically connects the terminal portion 17 to the gate driver 15 is arranged on the substrate 10. The signal that has been input through the external connecting terminal section 24 is supplied to the gate driver 15 via the line 26, the terminal portion 27, the contact portion 60, the terminal portion 17 and the line 16. The gate driver 15 generates gate signals in response to that signal and supplies the gate signals to the gate lines G. The gate driver 15 is suitably arranged monolithically on the substrate 10.

When one of the gate signals supplied from the gate driver 15 to any the gate lines G is selected (e.g., when the voltage of the gate signal goes high), the TFTs 12, of which the gates g are electrically connected to that gate line G, are turned ON. While those TFTs 12 are ON, a write operation is performed. Specifically, while the TFTs 12 are ON, a voltage corresponding to a video signal is applied to a portion of the liquid crystal layer 30 between a pixel electrode 11 and a signal electrode 21 that faces the pixel electrode 11, thereby conducting a display operation at an appropriate grayscale. It is recommended that while the TFTs 12 are ON, the pixel electrode 11 have a reference potential, which may be the ground potential, for example.

Hereinafter, advantages of the liquid crystal display device 100 of this embodiment over liquid crystal display devices as Comparative Examples 1 and 2 will be described.

Figure 2:
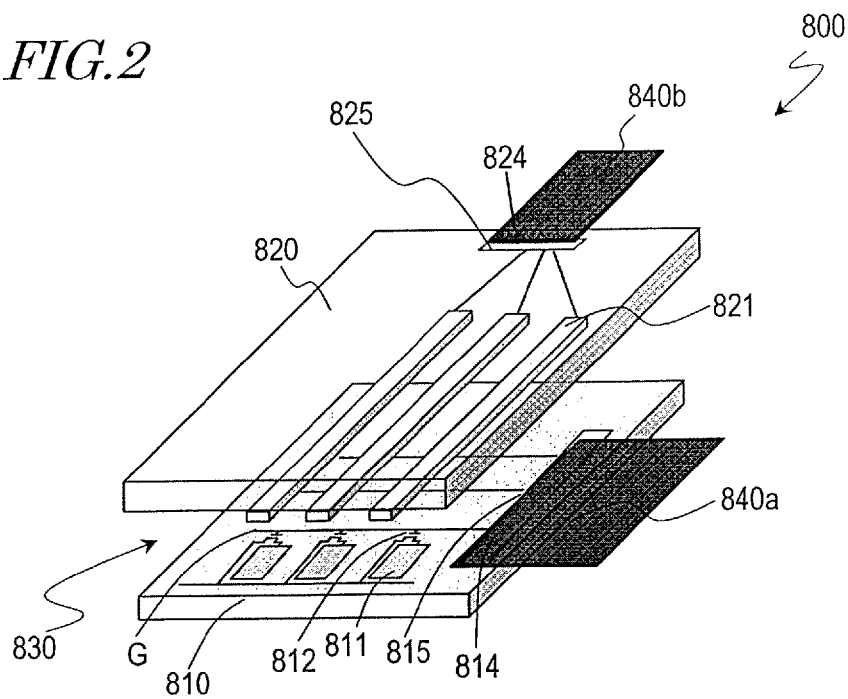
FIG. 2 A schematic perspective view illustrating a liquid crystal display device as Comparative Example 1.

First of all, the configuration of a liquid crystal display device as Comparative Example 1 will be described with reference to FIG. 2, which is a perspective view schematically illustrating a liquid crystal display device 800 as Comparative Example 1.

This liquid crystal display device 800 includes a substrate 810, another substrate 820 and a liquid crystal layer 830 interposed between the substrates 810 and 820. The substrate 810 includes gate lines G, pixel electrodes 811 and TFTs 812. The substrate 820 includes signal electrodes 821 which are electrically independent of each other.

In this liquid crystal display device 800, an external connecting terminal section 814 and a gate driver 815 are provided for the substrate 810, and an input board 840a is implemented on the external connecting terminal section 814. The gate driver 815 generates gate signals in response to a signal that has been input through the input board 840a and the external connecting terminal section 814, and supplies the gate signals to the gate lines G. Meanwhile, another external connecting terminal section 824 and a source driver 825 are provided for the substrate 820 and another input board 840b is implemented on the external connecting terminal section 824. The source driver 825 generates a video signal in response to a signal that has been input through the input board 840b and the external connecting terminal section 824, and supplies the video signal to any of the signal electrodes 821.

Figure 3:
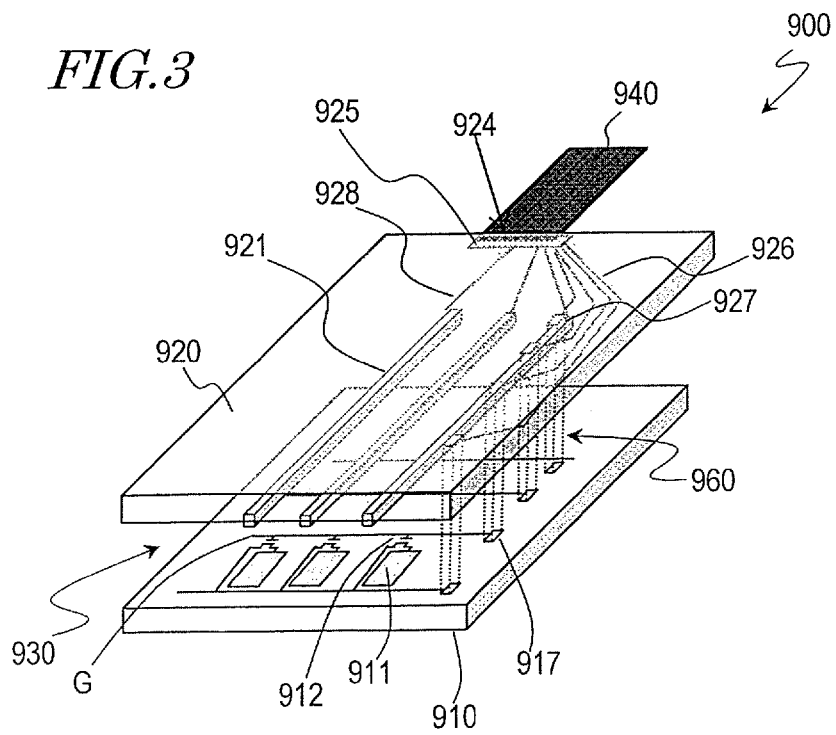
FIG. 3 A schematic perspective view illustrating a liquid crystal display device as Comparative Example 2.

Next, the configuration of a liquid crystal display device as Comparative Example 2 will be described with reference to FIG. 3, which is a perspective view schematically illustrating a liquid crystal display device 900 as Comparative Example 2.

This liquid crystal display device 900 includes a substrate 910, another substrate 920 and a liquid crystal layer 930 interposed between the substrates 910 and 920. The substrate 910 includes gate lines G, pixel electrodes 911 and TFTs 912. The substrate 920 includes signal electrodes 921 which are electrically independent of each other.

In this liquid crystal display device 900, an external connecting terminal section 924 and a driver 925 are provided for the substrate 920, and an input board 940 is implemented on the external connecting terminal section 924. The driver 925 generates gate signals and video signals in response to a signal that has been input through the input board 940 and the external connecting terminal section 924. In this liquid crystal display device 900, the driver 925 functions as both a gate driver and a source driver.

In the frame area of this liquid crystal display device 900, contact portions 960 are arranged to electrically connect the terminal portions 917 of the substrate 910 to the terminal portions 927 of the substrate 920. On the substrate 920, there are lines 926 which electrically connect the external connecting terminal section 924 to the terminal portions 927. Meanwhile, the terminal portions 917 of the substrate 910 are electrically connected to the gate lines G. The number of contact portions 960 provided is the same as that of the gate lines G arranged.

The video signals generated by the driver 925 are supplied to the signal electrodes 921 through lines 928. On the other hand, the gate signals generated by the driver 925 are supplied to the gate lines G through the lines 926, the terminal portions 927, the contact portions 960 and the terminal portions 917.

In the liquid crystal display device 800 of Comparative Example 1 that has been described with reference to FIG. 2, the external connecting terminal sections 814 and 824 are provided for the substrates 810 and 820, respectively, and therefore, the frame area should be rather broadened on both of the substrates 810 and 820. Likewise, in the liquid crystal display device 900 of Comparative Example 2 that has been described with reference to FIG. 3, in order to transmit the gate signals that have been generated by the driver 925 to the gate lines G, the number of contact portions 960 to provide should be the same as that of the gate signals generated, and therefore, the size of the frame area cannot be reduced, either. On top of that, since a lot of gate signals should be transmitted through the contact portions 960 in the liquid crystal display device 900, the yield may sometimes decrease.

On the other hand, in the liquid crystal display device 100 of this embodiment, the gate driver 15 generates gate signals in accordance with the signal that has been input through the external connecting terminal section 24 on the substrate 20. In the liquid crystal display device 100, there is no need to provide any external connecting terminal section for the substrate 10 and the signals that have been input to generate gate signals are transmitted from the substrate 20 to the substrate 10 via the single contact portion 60. As a result, the size of the frame area can be cut down. In addition, in the liquid crystal display device 100 of this embodiment, the number of signals to be transmitted through the contact portion 60 can be reduced, and therefore, a decrease in yield can be checked.

In this liquid crystal display device 100, the voltage of a liquid crystal capacitor is substantially maintained from a point in time when a write operation was performed on a selected pixel through a point in time when a write operation is performed on the same pixel next time, but the potential at a pixel electrode 11 varies as the potential at its associated signal electrode 21 varies. For that reason, if no particular control were performed, the potential at the pixel electrode 11 could be significantly different from the reference potential when that pixel is selected next time and a predetermined voltage is applied to the liquid crystal capacitor. That is why it is recommended that when a pixel is selected and a predetermined voltage is applied to a liquid crystal capacitor, the potential at the pixel electrode 11 be set to be equal to the reference potential. If the source s of a switching element 12 is electrically connected to a gate line G that is adjacent to the gate line G associated with the gate g of this switching element 12 as described above, the potential at the pixel electrode 11 can be set to be the reference potential during writing by making the gate signals change into not only low and high levels but also a third level as well.

Hereinafter, the voltage waveforms of the gate signals in the liquid crystal display device 100 will be described with reference to FIG. 4. FIG. 4(a) illustrates an equivalent circuit of the liquid crystal display device 100.

The gate driver 15 includes gate driver modules 15m which are provided for the respective gate lines G. In this description, the gate driver modules 15m will be sometimes referred to herein as just "modules 15m".

Also, in this description, the gate lines G on $(p+1)^{th}$ row, $(p+2)^{th}$ row, $(p+3)^{th}$ row and so forth will be sometimes referred to herein as gate lines $G_{p+1}$, $G_{p+2}$, $G_{p+3}$, and so on. The gate signals supplied to those gate lines $G_{p+1}$, $G_{p+2}$, $G_{p+3}$, and so on will be sometimes referred to herein as gate signals $GL_{p+1}$, $GL_{p+2}$, $GL_{p+3}$ and so on. And the modules 15m that generate those gate signals $GL_{p+1}$, $GL_{p+2}$, $GL_{p+3}$, and so on will be sometimes referred to herein as modules $15m_{p+1}$, $15m_{p+2}$, $15m_{p+3}$, and so on. In the same way, the pixel electrodes 11 on $(p+1)^{th}$ row, $(p+2)^{th}$ row, $(p+3)^{th}$ row and so forth will be sometimes referred to herein as pixel electrodes $11_{p+1}$, $11_{p+2}$, $11_{p+3}$, and so on. And the switching elements 12 associated with those pixel electrodes $11_{p+1}$, $11_{p+2}$, $11_{p+3}$, and so on will be sometimes referred to herein as switching elements $12_{p+1}$, $12_{p+2}$, $12_{p+3}$, and so on. Also, in this description, the signal electrodes 21 on $(q+1)^{th}$ column, $(q+2)^{th}$ column, $(q+3)^{th}$ column and so forth will be sometimes referred to herein as signal electrodes $21_{p+1}$, $21_{q+2}$, $21_{q+3}$, and so on.

The pixel electrodes $11_{p+1}$ are arranged between the gate lines $G_{p+1}$ and $G_{p+2}$ and the pixel electrodes $11_{q+2}$ are arranged between the gate lines $G_{p+2}$ and $G_{p+3}$. In the liquid crystal display device 100 of this embodiment, the respective gates g of the TFTs $12_{p+1}$ are electrically connected to the gate line $G_{p+1}$, the respective drains d of the TFTs $12_{p+1}$ are electrically connected to the pixel electrodes $11_{p+1}$, and the respective sources s of the TFTs $12_{p+1}$ are electrically connected to the gate line $G_{p+2}$. In the same way, the respective gates g of the TFTs $12_{p+2}$ are electrically connected to the gate line $G_{p+2}$, the respective drains d of the TFTs $12_{p+2}$ are electrically connected to the pixel electrodes $11_{p+2}$, and the respective sources s of the TFTs $12_{p+2}$ are electrically connected to the gate line $G_{p+3}$.

Figure 4:
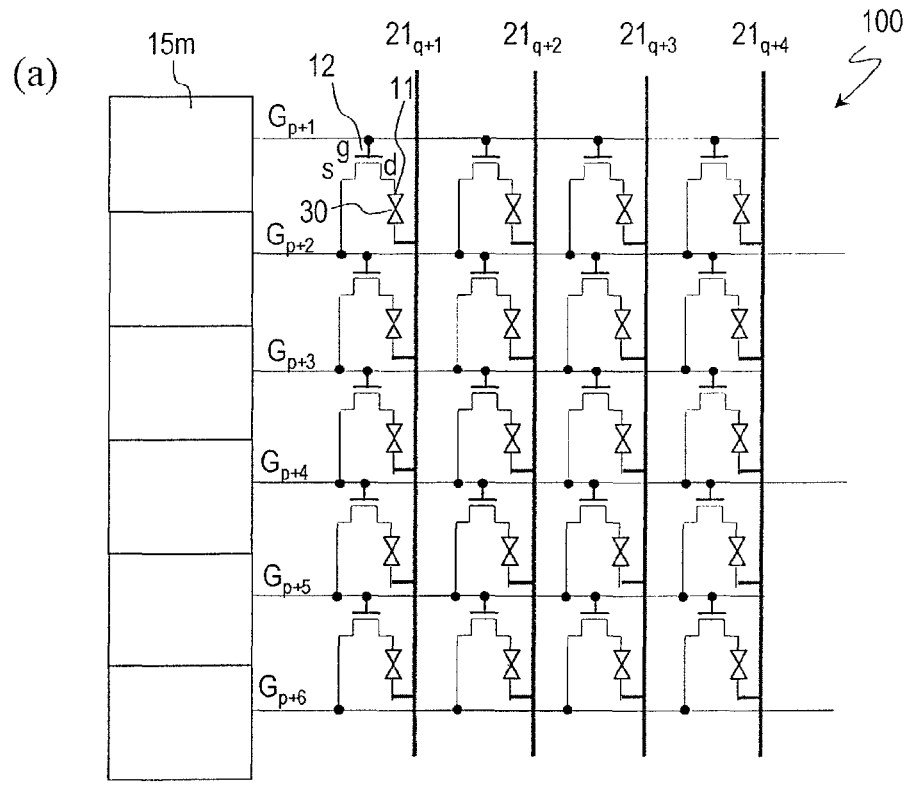
FIG. 4 (a) illustrates an equivalent circuit of the first embodiment and (b) illustrates the waveforms of gate signals in the liquid crystal display device of the first embodiment.
Figure 4:
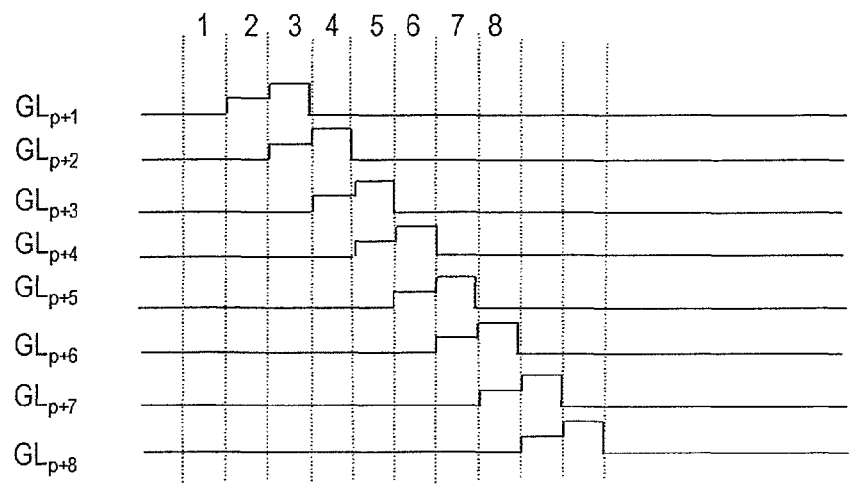

FIG. 4(b) shows the voltage waveforms of the gate signals $GL_{p+1}$ through $GL_{p+8}$ in the liquid crystal display device 100. In this example, each of these gate signals $GL_{p+1}$ through $GL_{p+8}$ is a tri-state signal, of which the voltage changes from one of L (low), M (middle) and H (high) levels into another. Specifically, each of these gate signals $GL_{p+1}$ through $GL_{p+8}$ goes high during writing, goes middle right before or just after writing, and remains low in the other periods. In FIG. 4, each of these gate signals $GL_{p+1}$ through $GL_{p+8}$ goes middle right before writing, goes high during writing, and then goes low.

The gate signal $GL_{p+2}$ has a phase lag of one horizontal scanning period with respect to the gate signal $GL_{p+1}$. The gate signal $GL_{p+3}$ has a phase lag of one horizontal scanning period with respect to the gate signal $GL_{p+2}$. In this manner, the phases of these gate signals $GL_{p+1}$ through $GL_{p+8}$ are shifted from each other by one horizontal scanning period each.

Now take at look at the $(p+1)^{th}$ row of pixels (that are associated with the gate line $G_{p+1}$, the gate signal $GL_{p+1}$, the pixel electrodes $11_{p+1}$ and the TFTs $12_{p+1}$) and the $(p+2)^{th}$ row of pixels (that are associated with the gate line $G_{p+2}$ the gate signal $GL_{p+2}$, the pixel electrodes $11_{q+2}$ and the TFTs $12_{p+2}$), for example. In horizontal scanning period 1, the gate signals $GL_{p+1}$ and $GL_{p+2}$ are both low. In this case, neither the TFTs $12_{p+1}$ nor the TFTs $12_{p+2}$ are selected.

Next, in horizontal scanning period 2, the gate signal $GL_{p+1}$ rises to the middle level but the gate signal $GL_{p+2}$ remains low. Even though the gate signal $GL_{p+1}$ now has the middle voltage level, the TFTs $12_{p+1}$ are still non-selected because the voltage level is lower than the threshold voltage of the TFTs $12_{p+1}$.

Thereafter, in horizontal scanning period 3, the gate signal $GL_{p+1}$ goes high and the gate signal $GL_{p+2}$ rises to the middle level. Since the gate signal $GL_{p+1}$ now has the high voltage level that is higher than the threshold voltage of the TFTs $12_{p+1}$, the TFTs $12_{p+1}$ are selected and a write operation is performed on them. As described above, these TFTs $12_{p+1}$ have their drains d connected to the pixel electrodes $11_{p+1}$ and their sources s connected to the gate line $G_{p+2}$, respectively. Since the middle level of the gate signal $GL_{p+2}$ corresponds to the reference potential, the potential at the pixel electrodes $11_{p+1}$ is set to be the reference potential, and a predetermined voltage corresponding to the potential at the signal electrodes 21 in horizontal scanning period 3 is applied to the liquid crystal layer 30 between the pixel electrodes $11_{p+1}$ and the signal electrodes $21_{p+1}$.

Next, in horizontal scanning period 4, the gate signal $GL_{p+1}$ goes low and the gate signal $GL_{p+2}$ goes high. Since the gate signal $GL_{p+1}$ has the low voltage level, the TFTs $12_{p+1}$ are now non-selected and the voltage between the pixel electrodes $11_{p+1}$ and the signal electrodes 21 is kept as high as the voltage between the pixel electrodes 11 and the signal electrodes 21 in horizontal scanning period 3. Meanwhile, the TFTs $12_{p+2}$ have their drains d connected to the pixel electrodes $11_{p+2}$ and their sources s connected to the gate line $G_{p+3}$ at the middle level. Consequently, the potential at the pixel electrodes $11_{p+2}$ is set to be the reference potential and a predetermined voltage corresponding to the potential at the signal electrodes 21 in horizontal scanning period 4 is applied to the liquid crystal layer 30 between the pixel electrodes $11_{p+2}$ and the signal electrodes 21.

As described above, the source s of each switching element 12 is electrically connected to a gate line G which is adjacent to the gate line G associated with the gate g of that switching element 12. Also, each gate signal changes into not only low and high levels but also a middle level as well. That is why the potential at the pixel electrode 11 can be set to be the reference potential during writing, and writing can get done appropriately.

Figure 5:
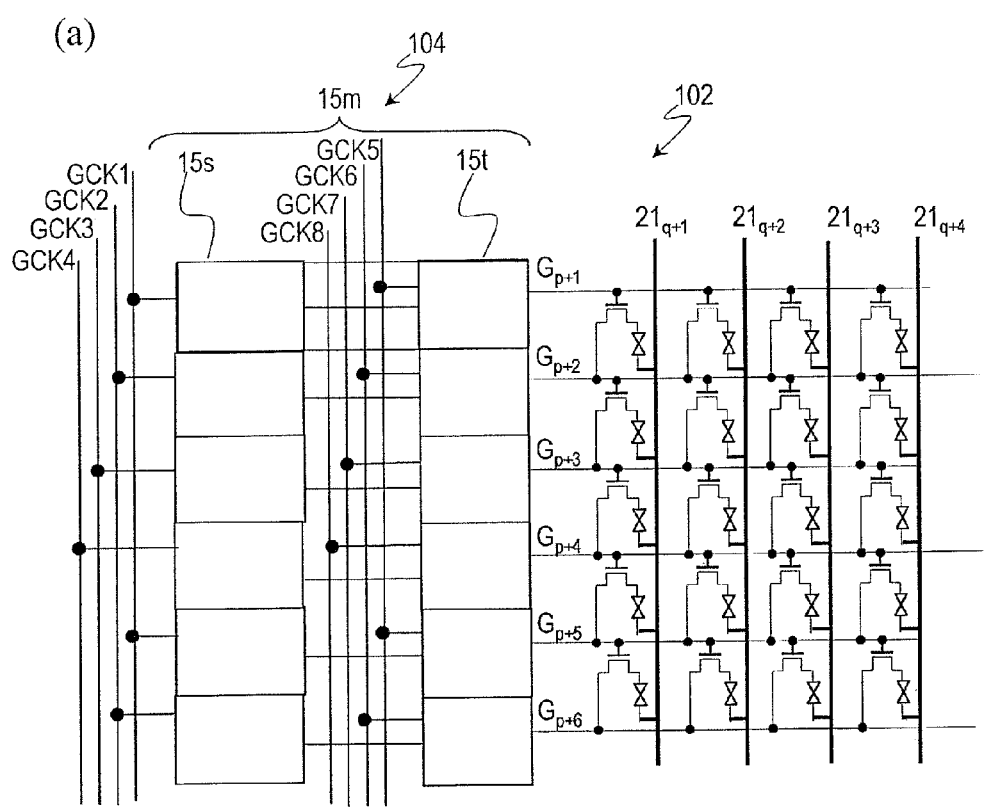
FIG. 5 (a) illustrates an equivalent circuit of the first embodiment and (b) illustrates the waveforms of gate clock signals and gate signals in the liquid crystal display device of the first embodiment.
Figure 5:
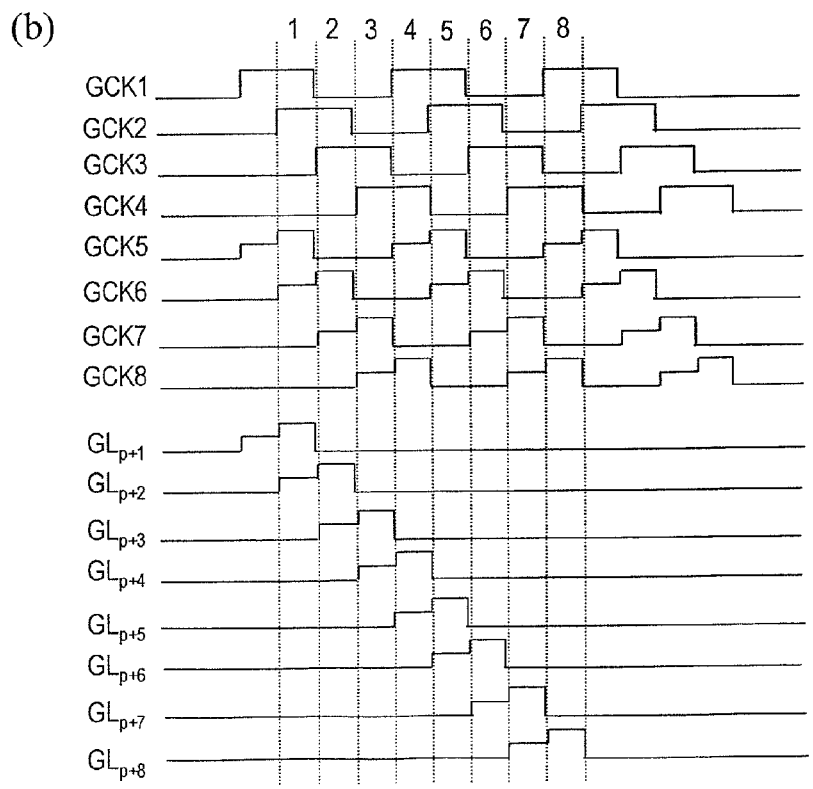

It should be noted that such a gate signal may be generated in response to a gate clock signal. For example, some gate clock signals may be output as gate signals. Hereinafter, it will be described with reference to FIG. 5 how the liquid crystal display device 100 generates a gate signal. FIG. 5(a) illustrates an equivalent circuit of the liquid crystal display device 100.

Each module 15m includes a stage section 15s and a buffer section 15t. A gate clock signal GCK1 to GCK4 is input to the stage section 15s, which generates a selection signal in response to the gate clock signal GCK1 to GCK4. Meanwhile, a gate clock signal GCK5 to GCK8 is input to the buffer section 15t, which generates a gate signal $GL_{p+1}$ to $GL_{p+8}$ based on the selection signal supplied from the stage section 15s and the gate clock signal GCK5 to GCK8.

Specifically, in the module $15m_{p+1}$, the stage section 15s generates a selection signal in response to a gate clock signal GCK1 and the buffer section 15t supplies a gate signal $GL_{p+1}$ based on the selection signal supplied from the stage section 15s and a gate clock signal GCK5. Meanwhile, in the module $15m_{p+2}$, the stage section 15s generates a selection signal in response to a gate clock signal GCK2 and the buffer section 15t supplies a gate signal $GL_{p+2}$ based on the selection signal supplied from the stage section 15s and a gate clock signal GCK6. Likewise, in the module $15m_{p+3}$, the stage section 15s generates a selection signal in response to a gate clock signal GCK3 and the buffer section 15t supplies a gate signal $GL_{p+3}$ based on the selection signal supplied from the stage section 15s and a gate clock signal GCK7. Furthermore, in the module $15m_{p+4}$, the stage section 15s generates a selection signal in response to a gate clock signal GCK4 and the buffer section 15t supplies a gate signal $GL_{p+4}$ based on the selection signal supplied from the stage section 15s and a gate clock signal GCK8. Speaking more generally, in a module $15m_{4+y}$ (where x is an integer that is equal to or greater than zero and y is an integer of one through four), the stage section 15s generates a selection signal in response to a gate clock signal GCKy and the buffer section 15t generates a gate signal $GL_{4x+y}$ based on the selection signal supplied from the stage section 15s and a gate clock signal GCK(y+4).

FIG. 5(b) shows the voltage waveforms of the gate clock signals GCK1 through GCK8 and gate signals $GL_{p+1}$ through $GL_{p+8}$ of the liquid crystal display device 100.

Each of these gate clock signals GCK1 through GCK4 inverts its level into low or high every two horizontal scanning periods. The gate clock signal GCK2 has a phase lag of one horizontal scanning period with respect to the gate clock signal GCK1. The gate clock signal GCK3 has a phase lag of one horizontal scanning period with respect to the gate clock signal GCK2. And the gate clock signal GCK4 has a phase lag of one horizontal scanning period with respect to the gate clock signal GCK3. In this manner, the phases of these gate clock signals GCK1 through GCK4 are shifted from each other by one horizontal scanning period each.

Each of the gate clock signals GCK5 through GCK8 is a tri-state signal, of which the voltage changes from one of L (low), M (middle) and H (high) levels into another. The voltage of each of these gate clock signals GCK5 through GCK8 changes periodically every four horizontal scanning periods. That is to say, the voltage of each of these gate clock signals GCK5 through GCK8 repeats the same series of level changes (i.e., changes from one of low, middle and high levels into another) in a predetermined order. Specifically, in this example, each gate clock signal remains low for almost two horizontal scanning periods, maintains the middle level for approximately one horizontal scanning period, goes high for approximately one horizontal scanning period, and then goes low for approximately two horizontal scanning periods again.

The gate clock signal GCK6 has a phase lag of one horizontal scanning period with respect to the gate clock signal GCK5. The gate clock signal GCK7 has a phase lag of one horizontal scanning period with respect to the gate clock signal GCK6. And the gate clock signal GCK8 has a phase lag of one horizontal scanning period with respect to the gate clock signal GCK7. In this manner, the phases of these gate clock signals GCK5 through GCK8 are also shifted from each other by one horizontal scanning period each.

In a horizontal scanning period in which one of these gate clock signals GCK5 through GCK8 is high, another one of the gate clock signals GCK5 through GCK8 is middle and the two others are low. Specifically, in a horizontal scanning period in which the gate clock signal GCK5 is high, the gate clock signal GCK6 is middle and the other gate clock signals GCK7 and GCK8 are low. Likewise, in a horizontal scanning period in which the gate clock signal GCK6 is high, the gate clock signal GCK7 is middle and the other gate clock signals GCK8 and GCK5 are low.

The buffer sections 15t of the modules 15m output the gate clock signals GCK5, GCK6, GCK7 and GCK8 as gate signals $GL_{p+1}$, $GL_{p+2}$, $GL_{p+3}$, and $GL_{p+4}$, respectively, in response to the selection signals supplied from the stage sections 15s. If associated one of the gate clock signals GCK5 through GCK8 is low when one buffer section 15t is selected in response to the selection signal, the gate signal output from it has an OFF state voltage level for a non-selected gate line G. As a result, the voltage applied to the liquid crystal capacitor associated with that gate line G does not change substantially. On the other hand, if associated one of the gate clock signals GCK5 through GCK8 is middle when one buffer section 15t is selected in response to the selection signal, the gate signal output from it has the reference potential level. As a result, the potential at the pixel electrodes 11 on the adjacent row can be set to be the reference potential by using this gate signal. And if associated one of the gate clock signals GCK5 through GCK8 is high when one buffer section 15$t$ is selected in response to the selection signal, the gate signal output from it has an ON state voltage level for a selected gate line G. As a result, a voltage corresponding to the potential at the signal electrode 21 at that time is applied to the liquid crystal capacitor associated with that gate line G.

Now take a look at the modules $15m_{p+1}$ and $15m_{p+2}$, for example. The stage section 15$s$ of the module $15m_{p+1}$ generates a selection signal in response to the gate clock signal GCK1. The buffer section 15$t$ generates a gate signal $GL_{p+1}$ based on the selection signal and the gate clock signal GCK5. When selected by the selection signal, the buffer section 15$t$ outputs the gate clock signal GCK5 as the gate signal $GL_{p+1}$.

The stage section 15$s$ of the module $15m_{p+2}$ generates a selection signal in response to the gate clock signal GCK2. The buffer section 15$t$ generates a gate signal $GL_{p+2}$ based on the selection signal and the gate clock signal GCK6. When selected by the selection signal, the buffer section 15$t$ outputs the gate clock signal GCK6 as the gate signal $GL_{p+2}$.

In the foregoing description, the source s of each switching element 12 is electrically connected to the adjacent gate line G, and the potential on that gate line G is set to be the reference potential in order to set the potential at the pixel electrodes 11 to be the reference potential when the switching element 12 is turned ON. However, this is only an example of the present invention. Alternatively, the source s of each switching element 12 may be electrically connected to a gate line G which is located two or more rows away from the current one, and the potential on that gate line G may be set to be the reference potential in order to set the potential at the pixel electrodes 11 to be the reference potential when the switching element 12 is turned ON.

Optionally, a reference potential line (not shown), of which the potential has been set in advance to be the reference potential, may be provided separately from the gate lines GL and the respective sources of the switching elements 12 may be connected to the reference potential line. In that case, the reference potential line is suitably arranged parallel to the gate line G. Nevertheless, if a different gate line G is used without providing such reference potential lines, the aperture ratio can be increased. In particular, by using an adjacent gate line G, the aperture ratio can be increased effectively.

In the foregoing description, the gate signals are supposed to change into one of three levels after another. However, this is just an example of the present invention. Alternatively, the gate signals may change from the low level into the high level, or vice versa, not through the middle level.

Embodiment 2

Figure 6:
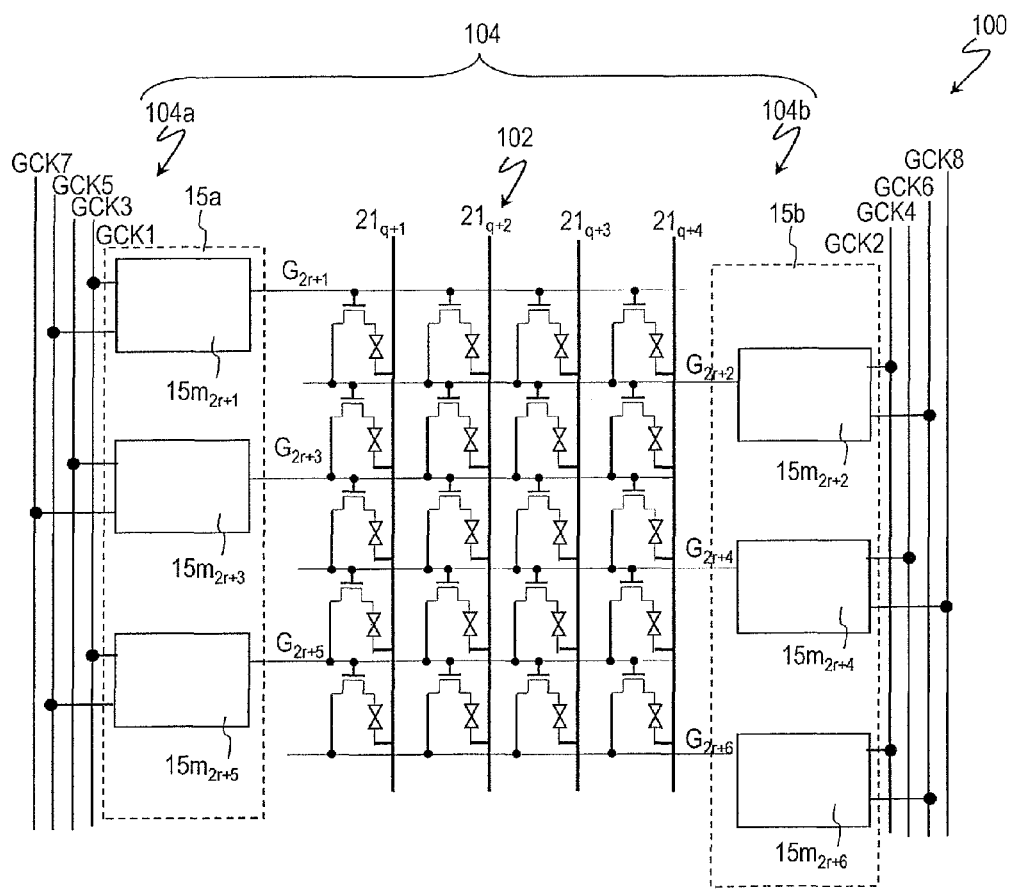
FIG. 6 Illustrates an equivalent circuit of a liquid crystal display device as a second embodiment of the present invention.

Hereinafter, a second embodiment of a liquid crystal display device according to the present invention will be described with reference to FIG. 6. The liquid crystal display device 100 of this embodiment has the same configuration as the liquid crystal display device of the first embodiment described above except that the gate driver is split into two sections which are arranged in two different positions in the frame area 104. Thus, their common features will not be described all over again to avoid redundancies.

The frame area 104 includes two areas 104$a$ and 104$b$, which are located on two opposite sides of the display area 102 in the row direction. In this description, these areas 104$a$ and 104$b$ will be sometimes referred to herein as a "first area" and a "second area", respectively.

In the liquid crystal display device 100 of this embodiment, the gate driver 15 includes two gate drivers 15$a$ and 15$b$ which are arranged in those areas 104$a$ and 104$b$, respectively. For example, the gate driver 15$a$ may supply gate signals to gate lines G on odd-numbered rows, while the gate driver 15$b$ may supply gate signals to gate lines G on even-numbered rows.

The gate driver 15$a$ generates gate signals to be supplied to gate lines G on odd-numbered rows in response to the gate clock signals GCK1, GCK3, GCK5 and GCK7. On the other hand, the gate driver 15$b$ generates gate signals to be supplied to gate lines on even-numbered rows in response to the gate clock signals GCK2, GCK4, GCK6 and GCK8. In the area 104$a$, arranged are gate clock lines LGCK1, LGCK3, LGCK 5 and LGCK7. And in the area 104$b$, arranged are gate clock lines LGCK2, LGCK4, LGCK 6 and LGCK8.

In the liquid crystal display device 100 of this embodiment, each module 15$m$ generates a gate signal in response to two gate clock signals. In each module 15$m$, the stage section 15$s$ generates a selection signal in response to one of the gate clock signals GCK1 through GCK4, and the buffer section 15$t$ outputs one of the gate clock signals GCK5 through GCK8 as the gate signal in accordance with that selection signal, as already described with reference to FIG. 5($a$).

Now take a loot at the modules 15$m$ of the gate driver 15$a$. The module $15m_{2r+1}$ supplies a gate signal which has been generated in response to gate clock signals GCK1 and GCK5 onto a gate line $G_{2r+1}$. Meanwhile, the module $15m_{2r+3}$ supplies a gate signal which has been generated in response to gate clock signals GCK3 and GCK7 onto a gate line $G_{2r+3}$. Likewise, the module $15m_{2r+5}$ supplies a gate signal which has been generated in response to gate clock signals GCK1 and GCK5 onto a gate line $G_{2r+5}$. And the module $15m_{2r+7}$ (not shown) supplies a gate signal which has been generated in response to gate clock signals GCK3 and GCK7 onto a gate line $G_{2r+7}$ (not shown). In this manner, the module $15m_{4x+1}$ (where x is an integer that is equal to or greater than zero) of the gate driver 15$a$ generates a gate signal in response to gate clock signals GCK1 and GCK5, and the module $15m_{4x+3}$ thereof generates a gate signal in response to gate clock signals GCK3 and GCK7.

Next, take a loot at the modules 15$m$ of the other gate driver 15$b$. The module $15m_{2r+2}$ supplies a gate signal which has been generated in response to gate clock signals GCK2 and GCK6 onto a gate line $G_{2r+2}$. Meanwhile, the module $15m_{2r+4}$ supplies a gate signal which has been generated in response to gate clock signals GCK4 and GCK8 onto a gate line $G_{2r+4}$. Likewise, the module $15m_{2r+6}$ supplies a gate signal which has been generated in response to gate clock signals GCK2 and GCK6 onto a gate line $G_{2r+6}$. And the module $15m_{2r+8}$ (not shown) supplies a gate signal which has been generated in response to gate clock signals GCK4 and GCK8 onto a gate line $G_{2r+8}$ (not shown). In this manner, the module $15m_{4x+2}$ (where x is an integer that is equal to or greater than zero) of the gate driver 15$b$ generates a gate signal in response to gate clock signals GCK2 and GCK6, and the module $15m_{4x+4}$ thereof generates a gate signal in response to gate clock signals GCK4 and GCK8.

In the liquid crystal display device 100 of this embodiment, by arranging two modules 15$m$ in two different areas 104$a$ and 104$b$, the gap between the modules 15$m$ that are arranged in the column direction can be increased and the length of the frame area 104 as measured in the column direction can be shortened. In addition, since the number of gate clock lines LGCK1 through LGCK8 provided for each area 104$a$, 104$b$ can be decreased, the interference between the gate clock lines can be reduced.

Even though each module 15m is supposed to generate a gate signal in response to two gate clock signals, this is just an example of the present invention. Alternatively, each module 15m may generate a gate signal in response to three gate clock signals. For example, the module $15m_{4x+1}$ (where x is an integer that is equal to or greater than zero) of the gate driver 15a may generate a gate signal in response to gate clock signals GCK1, GCK3 and GCK5. The module $15m_{4x+3}$ thereof may generate a gate signal in response to gate clock signals GCK1, GCK3 and GCK7. Meanwhile, the module $15m_{4x+2}$ (where x is an integer that is equal to or greater than zero) of the gate driver 15b may generate a gate signal in response to gate clock signals GCK2, GCK4 and GCK6. And the module $15m_{4x+4}$ thereof may generate a gate signal in response to gate clock signals GCK2, GCK4 and GCK8.

Embodiment 3

Figure 7:
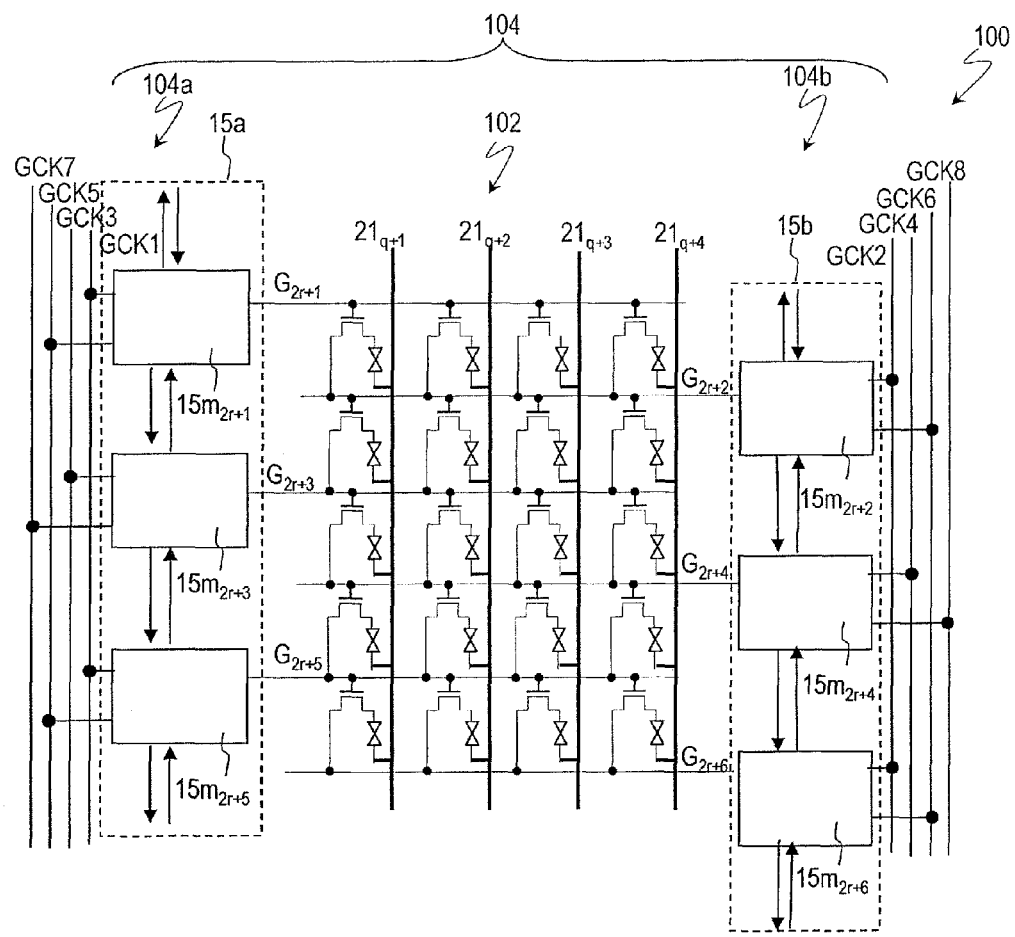
FIG. 7 Illustrates schematically a liquid crystal display device as a third embodiment of the present invention.

Hereinafter, a third embodiment of a liquid crystal display device according to the present invention will be described with reference to FIGS. 7 through 9. FIG. 7 illustrates schematically a liquid crystal display device 100 according to this embodiment. The liquid crystal display device 100 of this embodiment has the same configuration as the liquid crystal display device of the second embodiment described above except that the modules 15m are cascaded and each generate a gate signal in response to two gate clock signals and signals supplied from adjacent modules 15m. Thus, their common features will not be described all over again to avoid redundancies.

In FIG. 7, the gate driver 15 includes a gate driver 15a comprised of modules 15m, each of which supplies a gate signal to a gate line G on an odd-numbered row, and another gate driver 15b comprised of modules 15m, each of which supplies a gate signal to a gate line G on an even-numbered row. These gate drivers 15a and 15b are respectively arranged in first and second areas 104a and 104b of the frame area 104. In the liquid crystal display device 100 of this embodiment, each set of modules 15m are cascaded, and each module 15m receives cascade signals from adjacent modules 15m and outputs a cascade signal to another adjacent module 15m.

Figure 8:
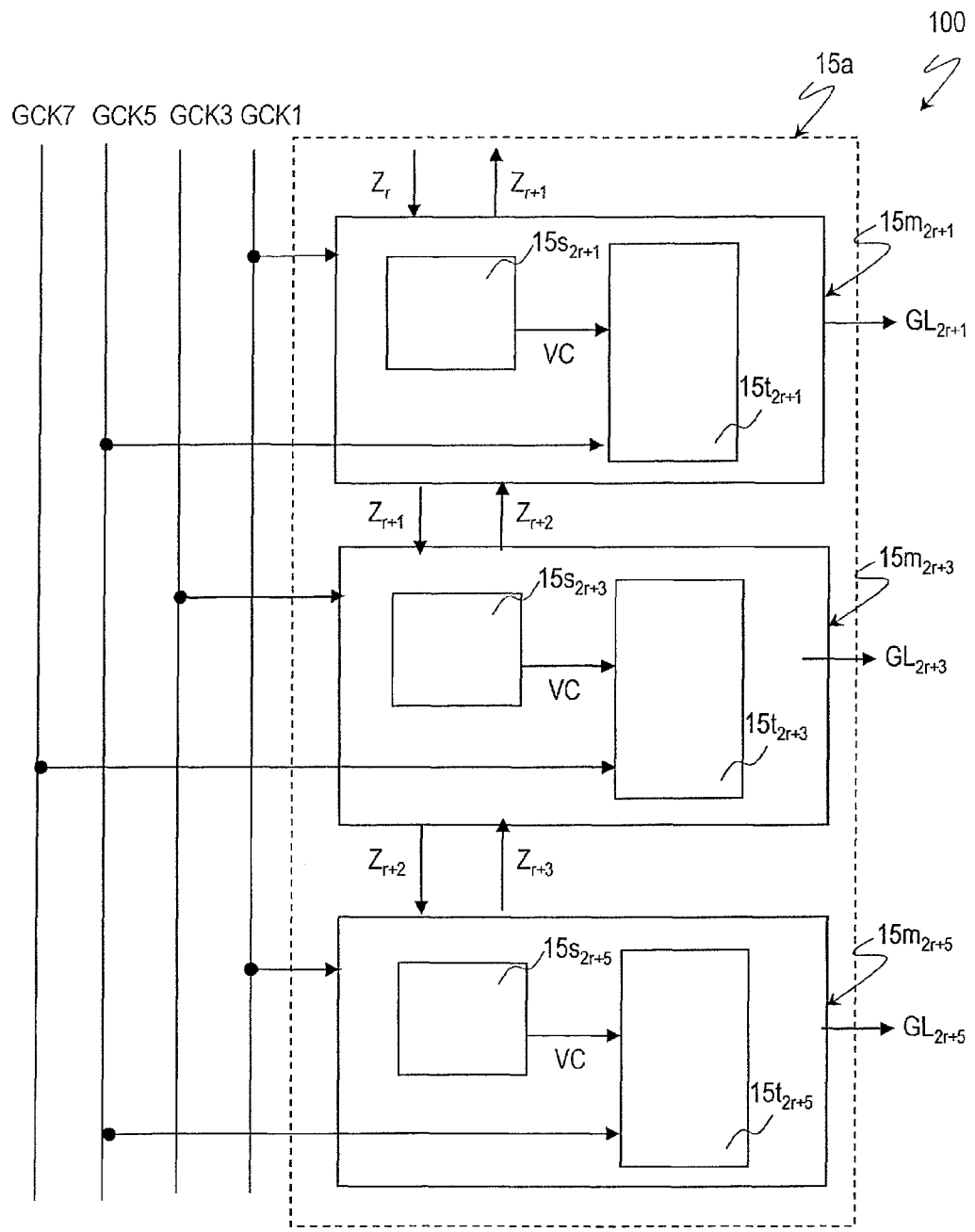
FIG. 8 Illustrates schematically a gate driver for the liquid crystal display device of the third embodiment.
Figure 9:
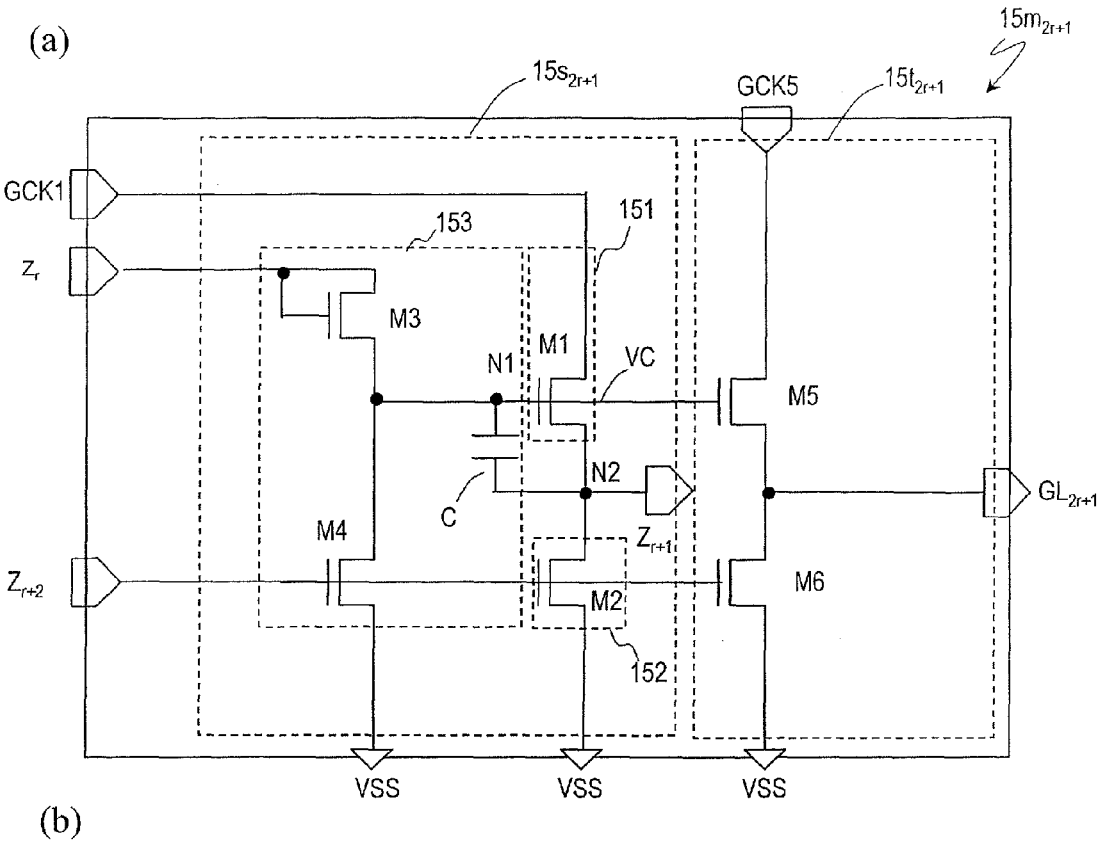
FIG. 9 (a) illustrates schematically a gate driver module for the liquid crystal display device of the third embodiment and (b) illustrates the waveforms of signals for use in the liquid crystal display device of the third embodiment.
Figure 9:
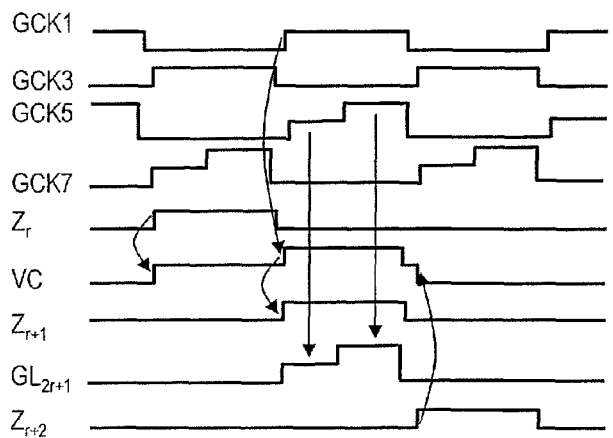

FIG. 8 illustrates exemplary sets of signals which are input to, and output from, the modules $15m_{2r+1}$, $15m_{2r+3}$ and $15m_{2r+5}$ of the gate driver 15a. As described above, each module 15m includes a stage section 15s and a buffer section 15t. In the following description, the respective stage sections 15s of the modules $15m_{2r+1}$, $15m_{2r+3}$ $15m_{2r+5}$ and so forth will be sometimes referred to herein as stage sections $15s_{2r+1}$, $15s_{2r+3}$ $15s_{2r+5}$ and so forth. Likewise, the respective buffer sections 15t of the modules $15m_{2r+1}$, $15m_{2r+3}$ $15m_{2r+5}$ and so forth will be sometimes referred to herein as buffer sections $15t_{2r+1}$, $15t_{2r+3}$ $15t_{2r+5}$ and so forth.

The module $15m_{2r+1}$ is the $(r+1)^{th}$ one of the gate driver 15a, and the modules $15m_{2r-1}$, $15m_{2r+3}$, and so on are the $r^{th}$ one, the $(r+2)^{th}$ one, etc. of the gate driver 15a. As described above, a cascade signal is output from a module 15m to an adjacent module 15m and cascade signals are input from other adjacent modules 15m to the former module 15m. In the following description, the signal output from the module $15m_{2r+1}$ will be sometimes referred to herein as a cascade signal $Z_{r+1}$ and the signals output from the modules $15m_{2r-1}$, $15m_{2r+3}$ and so on will be sometimes referred to herein as cascade signals $Z_r$, $Z_{r+2}$, etc.

First of all, take a look at the module $15m_{2r+1}$, in which the stage section $15s_{2r+1}$ receives a gate clock signal GCK1 and cascade signals $Z_r$ and $Z_{r+2}$ and generates a cascade signal $Z_{r+1}$ and a signal VC based on these signals. The cascade signals $Z_r$ and $Z_{r+2}$ are supplied from the stage sections $15s_{2r-1}$ and $15s_{2r+3}$, respectively. The buffer section $15t_{2r+1}$ receives a gate clock signal GCK5, the signal VC (and, if necessary, the cascade signal $Z_{r+2}$), and generates a gate signal $GL_{2r+1}$ based on these signals. It should be noted that if the signal VC is the selected one, the buffer section $15t_{2r+1}$ outputs the gate clock signal GCK5 as a gate signal $GL_{2r+1}$. That is why the signal VC is also called a "selection signal".

Next, take a look at the module $15m_{2r+3}$, in which the stage section $15s_{2r+3}$ receives a gate clock signal GCK3 and cascade signals $Z_{r+1}$ and $Z_{r+3}$ and generates a cascade signal $Z_{r+2}$ and a signal VC based on these signals. The buffer section $15t_{2r+3}$ receives a gate clock signal GCK7, the signal VC (and, if necessary, the cascade signal $Z_{r+3}$), and generates a gate signal $GL_{2r+3}$ based on these signals.

In this manner, the stage section 15s of each module 15m receives and outputs signals from/to the respective stage sections 15s of adjacent modules 15m. Thus, a shift register is formed by those stage sections 15s of multiple modules 15m.

Hereinafter, an exemplary configuration for the module $15m_{2r+1}$ will be described with reference to FIG. 9(a). As described above, the module $15m_{2r+1}$ includes a stage section $15s_{2r+1}$ and a buffer section $15t_{2r+1}$. The module $15m_{2r+1}$ further includes terminals GCK1 and GCK5 through which the gate clock signals GCK1 and GCK5 are input, terminals $Z_r$ and $Z_{r+2}$ through which the cascade signals $Z_r$ and $Z_{r+2}$ are input, and terminals $GL_{2r+1}$ and $Z_{r+1}$ through which the gate signal $GL_{2r+1}$ and the cascade signal $Z_{r+1}$ are output.

As shown in FIG. 9(a), the stage section $15s_{2r+1}$ includes a pull-up section 151, a pull-down section 152 and a pull-up driving section 153. The pull-up section 151 includes an NMOS transistor M1, of which the drain is connected to the terminal GCK1, the gate is connected to a node N1, and the source is connected to a node N2, which is further connected to the terminal $Z_{r+1}$.

The pull-down section 152 includes an NMOS transistor M2, of which the drain is connected to the node N2, the gate is connected to the terminal $Z_{r+2}$, and the source is connected to the terminal VSS, which may be grounded, for example.

The pull-up driving section 153 includes a capacitor C and two transistors M3 and M4. The capacitor C is arranged between the nodes N1 and N2, and is also called a "bootstrap capacitor". The transistor M3 includes a drain and a gate which are both connected to the terminal $Z_r$ and a source connected to the node N1. The transistor M4 includes a drain connected to the node N1, a gate connected to the terminal $Z_{r+2}$, and a source connected to the terminal VSS.

The buffer section $15t_{2r+1}$ includes two transistors M5 and M6. The transistor M5 includes a drain connected to the terminal GCK5, a gate connected to the node N1, and a source connected to the terminal $GL_{2r+1}$. The transistor M6 includes a drain connected to the terminal $GL_{2r+1}$, a gate connected to the terminal $Z_{r+2}$, and a source connected to the terminal VSS. It should be noted that even though the respective sources of the transistors M2, M4 and M6 are connected to the terminal VSS in this example, their potential levels at the terminal VSS are not necessarily equal to each other.

FIG. 9(b) shows the waveforms of the gate clock signals GCK1, GCK3, GCK5, and GCK7, the cascade signal $Z_r$, the selection signal VC, the cascade signal $Z_{r+1}$, the gate signal $GL_{2r+1}$ and the cascade signal $Z_{r+2}$. The selection signal VC indicates the potential at the node N1. The phase of the gate clock signal GCK3 is shifted by approximately two horizontal scanning periods with respect to the gate clock signal GCK1. Likewise, the phase of the gate clock signal GCK7 is shifted by approximately two horizontal scanning periods with respect to the gate clock signal GCK5.

Hereinafter, it will be described with reference to FIGS. 9(a) and 9(b) how signal voltages may vary at the module $15m_{2r+1}$ in the liquid crystal display device 100. When the cascade signal $Z_r$ rises from the low level to the high level, the transistor M3 turns ON and the signal VC rises from the low level to the middle level to turn the transistor M5 ON. In this example, when the cascade signal $Z_r$ rises from the low level to the high level, the gate clock signal GCK5 is low.

Also, when the cascade signal $Z_r$ rises, the capacitor C starts to be charged. And when the capacitor C is charged to a voltage level that is equal to or greater than the gate-source threshold voltage of the transistor M1, the transistor M1 turns ON. In this example, when the cascade signal $Z_r$ rises from the low level to the high level, the gate clock signal GCK1 is low. Even though the cascade signal $Z_r$ falls from the high level to the low level after that, the potential at the node N1 (i.e., the level of the selection signal VC) is maintained at the middle level due to the capacitor C.

Next, when the gate clock signal GCK1 rises from the low level to the high level, the potential level at the node N2 changes from the low level into the high level, so does the cascade signal $Z_{r+1}$. Also, as the potential level at the node N2 changes, the potential level at the node N1 changes from the middle level into the high level, so does the signal VC. To further raise the voltage level of the signal VC with the gate clock signal GCK1 in this manner is sometimes called a "bootstrap". As a result, the transistor M5 can be kept ON just as intended.

Furthermore, after the cascade signal $Z_r$ has fallen from the high level to the low level, the gate clock signal GCK5 rises from the low level to the high level by way of the middle level. In this case, if the selection signal VC indicates the middle or high level, the gate clock signal GCK5 is output as a gate signal $GL_{2r+1}$ through the terminal $GL_{2r+1}$. In this manner, a tri-state gate signal $GL_{2r+1}$ is output.

When the gate clock signal GCK1 falls from the high level to the low level after that, the selection signal VC falls from the high level to the middle level. Furthermore, when the cascade signal $Z_{r+2}$ rises from the low level to the high level, the transistor M2 turns ON and the selection signal VC falls from the middle level to the low level. After that, the buffer section $15t_{2r+1}$ will not be selected until a write operation is performed next time. In this manner, a gate signal $GL_{2r+1}$ is generated. As can be seen, if the potential level of the selection signal VC is raised by bootstrap during a period in which the gate clock signal GCK5 is at the middle to high voltage level, the gate clock signal GCK5 can be output as the gate signal $GL_{2r+1}$ substantially without being attenuated at the buffer section $15t_{2r+1}$.

Although the configuration of the stage section $15s_{2r+1}$ and buffer section $15t_{2r+1}$ of the module $15m_{2r+1}$ has been described, each of the other modules $15m$ in the area 104a and every module in the area 104b also have the same configuration.

As described above, in the module $15m_{2r+1}$ when the gate clock signal GCK1 rises from the low level to the high level, the cascade signal $Z_{r+1}$ also rises from the low level to the high level. And when the gate clock signal GCK1 falls from the high level to the low level, the cascade signal $Z_{r+1}$ also falls from the high level to the low level. Likewise, in the module $15m_{2r+3}$, when the gate clock signal GCK3 rises from the low level to the high level, the cascade signal $Z_{r+1}$ also rises from the low level to the high level. And when the gate clock signal GCK3 falls from the high level to the low level, the cascade signal $Z_{r+2}$ also falls from the high level to the low level.

Also, in the module $15m_{2r+1}$, when the gate clock signal GCK1 rises from the low level to the high level, the selection signal VC rises from the middle level to the high level, and the gate clock signal GCK5 is output as a gate signal $GL_{2r+1}$. In this case, if the cascade signal $Z_{r+2}$ were high at this point in time, then the gate clock signal GCK5 would be output through the terminal VSS. For that reason, if the selection signal VC is high (i.e., if the gate clock signal GCK1 is high), the cascade signal $Z_{r+2}$ is suitably low (i.e., the gate clock signal GCK3 is suitably low).

As can be seen, the gate clock signals GCK1 and GCK3 should not go high at the same time. Specifically, the gate clock signal GCK1 suitably rises from the low level to the high level after the gate clock signal GCK3 has fallen from the high level to the low level. Likewise, the gate clock signal GCK3 suitably rises from the low level to the high level after the gate clock signal GCK1 has fallen from the high level to the low level. In this manner, it is possible to prevent the gate clock signal GCK5 from being output through the terminal VSS in the module 15m.

Even though the foregoing description has been focused on the modules 15m of the gate driver 15a, the same statement also applies to the modules 15m of the gate driver 15b. For example, the gate clock signal GCK2 suitably rises from the low level to the high level after the gate clock signal GCK4 has fallen from the high level to the low level. Likewise, the gate clock signal GCK4 suitably rises from the low level to the high level after the gate clock signal GCK2 has fallen from the high level to the low level. Optionally, to enable each module 15m to generate a gate signal securely, dummy modules (not shown) may be provided at both terminals of each module 15m in the gate drivers 15a and 15b.

Also, in the foregoing description, the gate driver includes two gate drivers 15a and 15b which are respectively arranged in the areas 104a and 104b that are located on two opposite sides of the display area 102 in the frame area 104. However, this is only an example of the present invention. Alternatively, the gate driver 15 may be provided on just one side of the display area 102 as in the first embodiment that has already been described with reference to FIGS. 1 through 5. In that case, the module $15m_{2r+3}$ receives cascade signals $Z_{2r+1}$ and $Z_{2r+5}$ from the modules $15m_{2r+1}$ and $15m_{2r+5}$, respectively. Likewise, the module $15m_{2r+4}$ receives cascade signals $Z_{2r+2}$ and $Z_{2r+6}$ from the modules $15m_{2r+2}$ and $15m_{2r+6}$ respectively.

Embodiment 4

Figure 10:
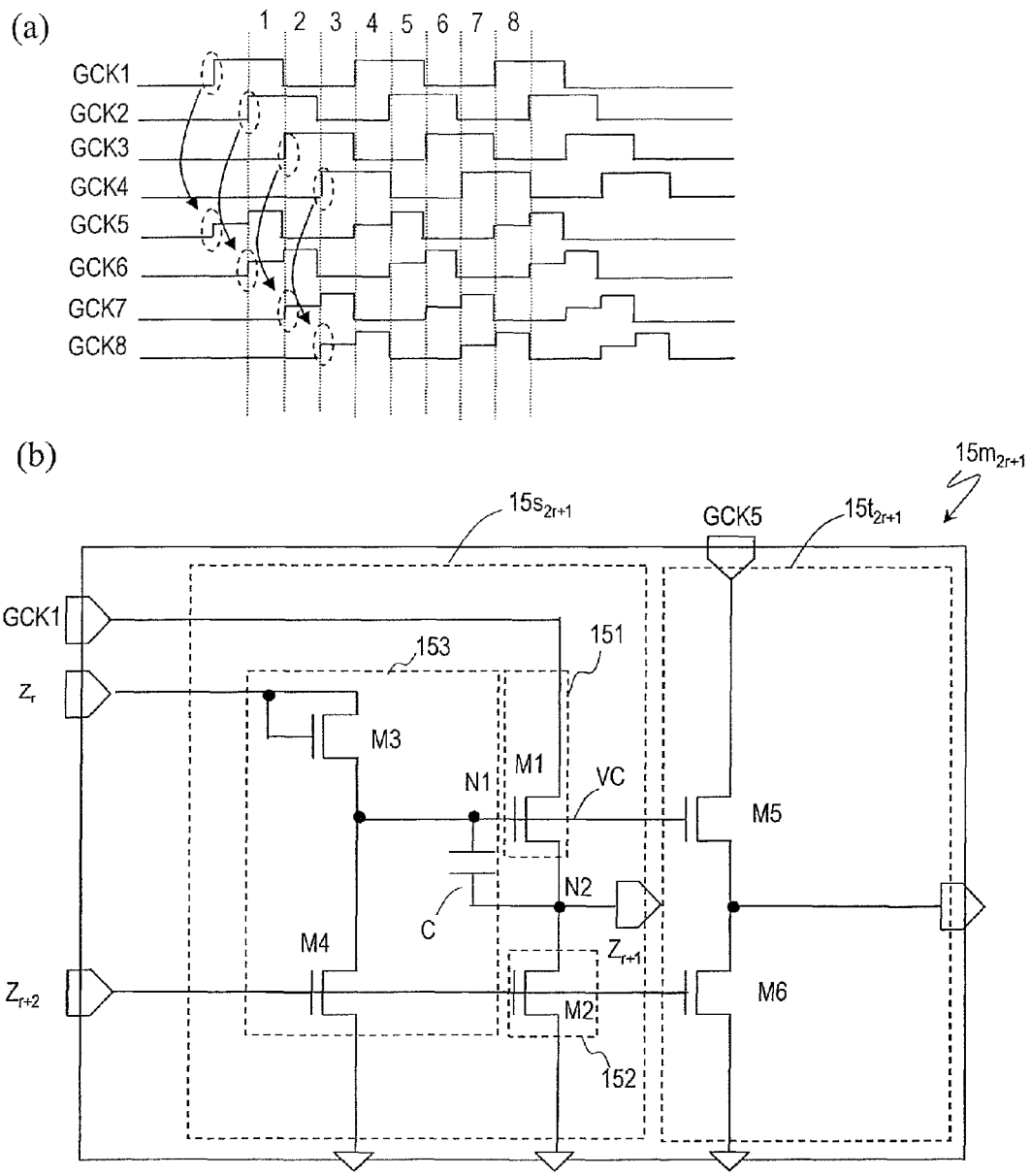
FIG. 10 (a) illustrates the voltage waveforms of gate signals for a liquid crystal display device as a fourth embodiment of the present invention, and (b) illustrates schematically a gate driver module for use in the liquid crystal display device of the fourth embodiment.
Figure 11:
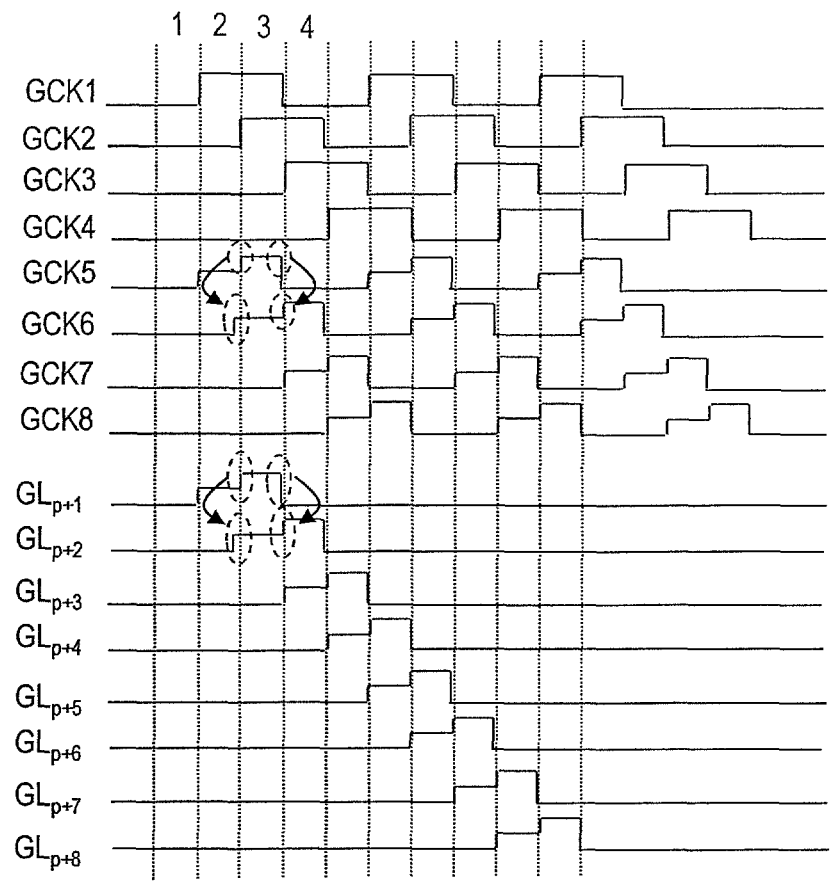
FIG. 11 Illustrates the waveforms of gate signals and gate clock signals for use in the liquid crystal display device of the fourth embodiment.

Hereinafter, a fourth embodiment of a liquid crystal display device according to the present invention will be described with reference to FIGS. 10 and 11. The liquid crystal display device 100 of this embodiment has the same configuration as the liquid crystal display device described above except that the leading and trailing edges of the gate clock signals GCK1 through GCK8 satisfy a predetermined relation. And their common features will not be described all over again to avoid redundancies.

FIG. 10(a) shows the waveforms of gate clock signals GCK1 through GCK8 in the liquid crystal display device 100 of this embodiment. In the liquid crystal display device 100 of this embodiment, the gate clock signal GCK1 rises from the low level to the high level when the gate clock signal GCK5 rises from the low level to the middle level. In the same way, the gate clock signal GCK2 rises from the low level to the high level when the gate clock signal GCK6 rises from the low level to the middle level. The gate clock signal GCK3 rises from the low level to the high level when the gate clock signal GCK7 rises from the low level to the middle level. And the gate clock signal GCK4 rises from the low level to the high level when the gate clock signal GCK8 rises from the low level to the middle level. In this manner, the voltage level can be raised more efficiency by bootstrap.

Next, it will be described with reference to FIG. 10(b) what advantages are achieved if the rise of the gate clock signal GCK1 is synchronous with the rise of the gate clock signal GCK5 from the low level to the middle level in the module $15m_{2r+1}$. FIG. 10(b) schematically illustrates the module $15m_{2r+1}$. As the configuration shown in FIG. 10(b) is the same as the one shown in FIG. 9(a), their common features will not be described all over again to avoid redundancies.

Unless the gate clock signal GCK1 rises synchronously with the gate clock signal GCK5, the potential variation $\Delta VC$ at the node N1 due to the rise of the gate clock signal GCK1 is represented as:

$$\Delta VC = \Delta GCK \times (C_C + C_{M1})/(C_C + C_{M1} + C_{M3} + C_{M4} + C_{M5})$$

where $\Delta GCK$ indicates the potential variation when GCK1 rises from the low level to the high level, $C_C$ indicates the capacitance value of the capacitor C, and $C_{M1}$ through $C_{M6}$ indicate the respective capacitance values of the transistors M1 through M6.

On the other hand, if the gate clock signal GCK1 rises synchronously with the gate clock signal GCK5, the potential variation $\Delta VC$ at the node N1 due to the rise of the gate clock signal GCK1 is represented as:

$$\Delta VC = \Delta GCK \Delta (C_C + C_{M1} + C_{M5})/C_C + C_{M1} + C_{M3} + C_{M4} + C_{M5})$$

Comparing these potential variations $\Delta VC$ to each other, it can be seen that if the gate clock signals GCK1 and GCK5 are synchronous with each other, the potential variation $\Delta VC$ increases, so does the drivability of the transistor M5. Consequently, the gate signal $GL_{2r+1}$ can rise in a shorter time. As can be seen, if the rise of the gate clock signals GCK1 through GCK4 from the low level to the high level is synchronous with that of the gate clock signals GCK5 through GCK8 (which are input to the same module 15m) from the low level to the middle level, the gate signal can rise in a shorter time.

It should be noted that before the voltage of a gate signal applied to a certain gate line G rises from the middle level to the high level, the voltage of a gate signal applied to its adjacent gate line G suitably rises from the low level to the middle level. Also, after the voltage of a gate signal applied to a certain gate line G has fallen from the high level to the low level, the voltage of a gate signal applied to its adjacent gate line G suitably rises from the middle level to the high level.

Next, the relation in voltage waveform between the gate signals $GL_{p+1}$ through $GL_{p+8}$ and gate clock signals GCK1 through GCK8 supplied to the gate lines G in the liquid crystal display device 100 of this embodiment will be described with reference to FIG. 11.

In this example, each of the gate signals $GL_{p+1}$ through $GL_{p+8}$ is also a tri-state signal, of which the voltage changes from one of L (low), M (middle) and H (high) levels into another. Specifically, each of these gate signals $GL_{p+1}$ through $GL_{p+8}$ goes high during writing, goes middle right before or just after writing, and remains low in the other periods. In this example, each of these gate signals $GL_{p+1}$ through $GL_{p+8}$ goes middle right before writing, goes high during writing, and then goes low. The gate signal $GL_{p+2}$ has a phase lag of one horizontal scanning period with respect to the gate signal $GL_{p+1}$. The gate signal $GL_{p+3}$ has a phase lag of one horizontal scanning period with respect to the gate signal $GL_{p+2}$. In this manner, the phases of these gate signals $GL_{p+1}$ through $GL_{p+8}$ are shifted from each other by one horizontal scanning period each.

Now take at look at the gate signals $GL_{p+1}$ and $GL_{p+2}$, for example. In horizontal scanning period 1, the gate signals $GL_{p+1}$ and $GL_{p+2}$ are both low. In this case, neither the TFTs $12_{p+1}$ nor the TFTs $12_{p+2}$ are selected.

Next, in horizontal scanning period 2, the gate signal $GL_{p+1}$ rises to the middle level but the gate signal $GL_{p+2}$ remains low. Even though the gate signal $GL_{p+1}$ now has the middle voltage level, the TFTs $12_{p+1}$ are still non-selected because the voltage level is lower than the threshold voltage of the TFTs $12_{p+1}$.

Thereafter, in horizontal scanning period 3, the gate signal $GL_{p+1}$ goes high and the gate signal $GL_{p+2}$ rises to the middle level. Since the gate signal $GL_{p+1}$ now has the high voltage level that is higher than the threshold voltage of the TFTs $12_{p+1}$, the TFTs $12_{p+1}$ are selected and a write operation is performed on them. As described above, these TFTs $12_{p+1}$ have their drains d connected to the pixel electrodes $11_{p+1}$ and their sources s connected to the gate line $G_{p+2}$, respectively. Since the middle level of the gate signal $GL_{p+2}$ corresponds to the reference potential, the potential at the pixel electrodes $11_{p+1}$ is set to be the reference potential, and a predetermined voltage corresponding to the potential at the signal electrodes 21 in horizontal scanning period 3 is applied to the liquid crystal layer 30 between the pixel electrodes $11_{p+1}$ and the signal electrodes 21.

In the liquid crystal display device 100 of this embodiment, in this horizontal scanning period 3, before the potential of the gate signal $GL_{p+1}$ changes from the middle level to the high level, the potential of the gate signal $GL_{p+2}$ changes from the low level to the middle level. As a result, while the TFTs $12_{p+1}$ are ON, the variation in reference potential at the pixel electrodes $11_{p+1}$ can be minimized and the influence of the noise can be reduced.

Next, in horizontal scanning period 4, the gate signal $GL_{p+1}$ goes low and the gate signal $GL_{p+2}$ goes high. Since the gate signal $GL_{p+1}$ has the low voltage level, the TFTs $12_{p+1}$ are now non-selected and the voltage between the pixel electrodes $11_{p+1}$ and the signal electrodes 21 is kept as high as the voltage between the signal electrodes 21 and the pixel electrodes 11 in horizontal scanning period 3.

In the liquid crystal display device 100 of this embodiment, in this horizontal scanning period 4, after the potential of the gate signal $GL_{p+1}$ has fallen from the high level to the low level, the potential of the gate signal $GL_{p+2}$ rises from the middle level to the high level. As a result, while the TFTs $12_{p+1}$ are ON, the variation in reference potential at the pixel electrodes $11_{p+1}$ can be minimized and the influence of the noise can be reduced.

In this manner, before the voltage of a gate signal applied to a certain gate line G rises from the middle level to the high level, the voltage of a gate signal applied to its adjacent gate line G suitably rises from the low level to the middle level. Also, after the voltage of a gate signal applied to a certain gate line G has fallen from the high level to the low level, the voltage of a gate signal applied to its adjacent gate line G suitably rises from the middle level to the high level.

As described above, each of these gate clock signals GCK5 through GCK8 is output as a gate signal during a period in which the gate clock signal is selected by the selection signal VC. That is why before the gate clock signal GCK5 rises from the middle level to the high level, the gate clock signal GCK6 suitably rises from the low level to the middle level. Also, after the gate clock signal GCK5 has fallen from the high level to the low level, the gate clock signal GCK6 suitably rises from the middle level to the high level.

In the same way, before the gate clock signal GCK6 rises from the middle level to the high level, the gate clock signal GCK7 suitably rises from the low level to the middle level. Also, after the gate clock signal GCK6 has fallen from the high level to the low level, the gate clock signal GCK7 suitably rises from the middle level to the high level. Likewise, before the gate clock signal GCK7 rises from the middle level to the high level, the gate clock signal GCK8 suitably rises from the low level to the middle level. Also, after the gate clock signal GCK7 has fallen from the high level to the low level, the gate clock signal GCK8 suitably rises from the middle level to the high level. Furthermore, before the gate clock signal GCK8 rises from the middle level to the high level, the gate clock signal GCK5 suitably rises from the low level to the middle level. Also, after the gate clock signal GCK8 has fallen from the high level to the low level, the gate clock signal GCK5 suitably rises from the middle level to the high level.

Embodiment 5

Figure 12:
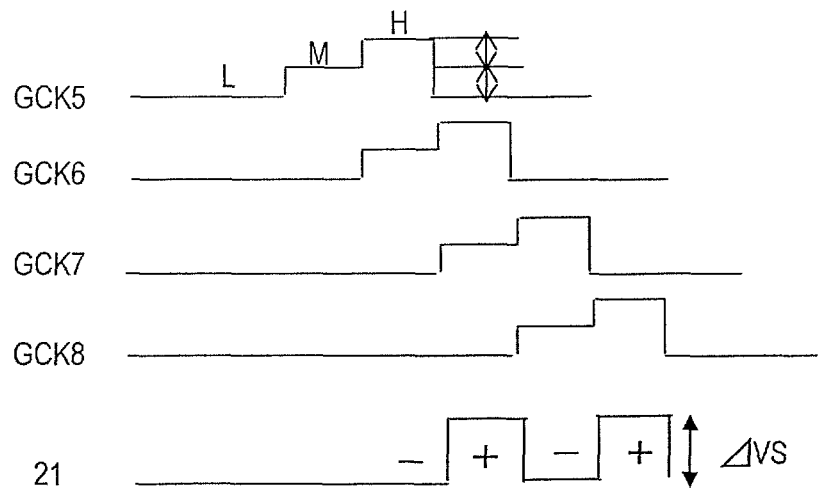
FIG. 12 (a) illustrates the waveforms of signals for use in a liquid crystal display device as a fifth embodiment of the present invention and (b) schematically shows the relation between the low, middle and high potential levels of gate clock signals GCK5 through GCK8.
Figure 12:
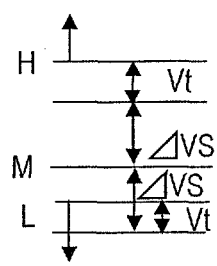

Hereinafter, a fifth embodiment of a liquid crystal display device according to the present invention will be described with reference to FIG. 12. The liquid crystal display device 100 of this embodiment has the same configuration as the liquid crystal display device described above except that the low, middle and high potentials of the gate clock signals GCK5 through GCK8 satisfy a predetermined relation. Thus, their common features will not be described all over again to avoid redundancies. In this embodiment, the voltage of each of the gate clock signals GCK5, GCK6, GCK7 and GCK8 also changes in the order of low, middle and high levels as already described with reference to FIG. 5(b). Also, as already described with reference to FIGS. 4, 5, 7, 8 and 9, each of these gate clock signals GCK5, GCK6, GCK7 and GCK8 is output as a gate signal while selected by the selection signal.

In the liquid crystal display device 100 of this embodiment, in each of the gate clock signals GCK5, GCK6, GCK7 and GCK8, the potential difference between their high and middle levels is greater than the sum of the maximum potential difference of the signal electrodes 21 and the threshold voltage of the switching elements 12. Supposing ΔVS indicates the maximum amplitude of the video signal and Vt indicates the threshold voltage of the switching elements 12, the potential difference between the high and middle levels of the gate clock signal GCK5 is equal to or greater than ΔVS+Vt.

In general, the potential at a signal electrode 21 inverts every horizontal scanning period with respect to the reference potential, thus minimizing a decline in display performance. The relation between the potential at the signal electrode 21 and the reference potential is also called a "polarity", which inverts every horizontal scanning period. For example, if the liquid crystal display device 100 operates in normally black mode, when the color white is displayed for multiple horizontal scanning periods, the potential variation at the signal electrode 21 comes to have the maximum value. When the reference potential is written, the potential at the pixel electrodes 11 could be higher (i.e., on the + side) at most by the amplitude of the video signal. However, by setting the potential difference between the middle and high levels as described above, the switching elements (such as TFTs) 12 can be operated in the linear range just as intended.

Also, in each of the gate clock signals GCK5, GCK6, GCK7 and GCK8, the potential difference between their middle and low levels is suitably greater than the difference between the maximum potential difference of the signal electrodes 21 and the threshold voltage of the switching elements 12. That is to say, the potential difference between the middle and low levels is suitably equal to or greater than ΔVS−Vt, where ΔVS indicates the maximum amplitude of the video signal and Vt indicates the threshold voltage of the switching elements 12 as described above. By setting the potential difference between the middle and low levels in this manner, the switching elements 12 in non-selected state can be kept OFF.

Embodiment 6

Hereinafter, a sixth embodiment of a liquid crystal display device according to the present invention will be described with reference to FIG. 13. The liquid crystal display device 100 of this embodiment has the same configuration as the liquid crystal display device described above except that the relative arrangement of the pixel electrodes, the switching elements and the gate lines is different and that the levels of the gate clock signals GCK5 through GCK8 and gate signals change in a different order. Thus, their common features will not be described all over again to avoid redundancies.

FIG. 13(a) illustrates an equivalent circuit of a liquid crystal display device 100 according to this embodiment. Pixel electrodes $11_{p+2}$ are arranged between gate lines $G_{p+1}$ and $G_{p+2}$, and pixel electrodes $11_{p+3}$ are arranged between gate lines $G_{p+2}$ and $G_{p+3}$. In the liquid crystal display device 100 of this embodiment, each TFT 12 has its source s connected to the gate line G to be selected before its own gate g is selected. For example, the TFT $12_{p+2}$ has its drain d electrically connected to the pixel electrode $11_{p+2}$ and has its source s electrically connected to the gate line $G_{p+1}$.

Also, each module 15m includes a stage section 15s and a buffer section 15t. One of gate clock signals GCK1 through GCK4 is input to each stage section 15s, which generates a selection signal in response to the gate clock signal received GCK1, GCK2, GCK3 or GCK4. One of gate clock signals GCK5 through GCK8 is input to each buffer section 15t, which generates a gate signal $GL_{p+1}$ through GLp+8 based on the selection signal supplied from the stage section 15s and the gate clock signal received GCK5, GCK6, GCK7 or GCK8.

FIG. 13(b) illustrates the voltage waveforms of the gate clock signals GCK1 through GCK8 and gate signals $GL_{p+1}$ through $GL_{p+8}$ in the liquid crystal display device 100.

First of all, look at the gate signals $GL_{p+1}$ through $GL_{p+8}$. The gate signal $GL_{p+2}$ has a phase lag of one horizontal scanning period with respect to the gate signal $GL_{p+1}$. The gate signal $GL_{p+3}$ has a phase lag of one horizontal scanning period with respect to the gate signal $GL_{p+2}$. In this manner, the phases of these gate signals $GL_{p+1}$ through $GL_{p+8}$ are shifted from each other by one horizontal scanning period each.

Now take at look at the $(p+2)^{th}$ row of pixels (that are associated with the gate line $G_{p+2}$, the gate signal $GL_{p+2}$, the pixel electrodes $11_{p+2}$ and the TFTs $12_{p+2}$) and the $(p+3)^{th}$ row of pixels (that are associated with the gate line $G_{p+3}$, the gate signal $GL_{p+3}$, the pixel electrodes $11_{p+3}$ and the TFTs $12_{p+3}$), for example. In horizontal scanning period 1, the gate signals $GL_{p+2}$ and $GL_{p+3}$ are both low. In this case, neither the TFTs $12_{p+2}$ nor the TFTs $12_{p+3}$ are selected.

Next, in horizontal scanning period 2, the gate signal $GL_{p+2}$ goes high but the gate signal $GL_{p+3}$ remains low. Since the gate signal $GL_{p+2}$ now has the high voltage level that is higher than the threshold voltage of the TFTs $12_{p+2}$, the TFTs $12_{p+2}$ are selected and a write operation is performed on them. These TFTs $12_{p+2}$ have their drains d connected to the pixel electrodes $11_{p+2}$, their gates g connected to the gate line $G_{p+2}$, and their sources s connected to the gate line $G_{p+1}$, respectively. At this point in time, the gate line $G_{p+1}$ has the middle level. Since the middle level of the gate signal $GL_{p+1}$ corresponds to the reference potential, the potential at the pixel electrodes $11_{p+2}$ is set to be the reference potential, and a predetermined voltage corresponding to the potential at the signal electrodes 21 in horizontal scanning period 2 is applied to the liquid crystal layer 30 between the pixel electrodes $11_{p+2}$ and the signal electrodes 21.

Thereafter, in horizontal scanning period 3, the gate signal $GL_{p+2}$ falls to the middle level and the gate signal $GL_{p+3}$ goes high. Even though the gate signal $GL_{p+2}$ now has the middle voltage level that is lower than the threshold voltage of the TFTs $12_{p+2}$, the TFTs $12_{p+2}$ are non selected. On the other hand, since the gate signal $GL_{p+3}$ now has the high voltage level that is higher than the threshold voltage of the TFTs $12_{p+3}$, the TFTs $12_{p+3}$ are selected and a write operation is performed on them. As described above, these TFTs $12_{p+3}$ have their drains d connected to the pixel electrodes $11_{p+3}$ and their sources s connected to the gate line $G_{p+2}$, respectively. Since the middle level of the gate signal $GL_{p+2}$ corresponds to the reference potential, the potential at the pixel electrodes $11_{p+3}$ is set to be the reference potential, and a predetermined voltage corresponding to the potential at the signal electrodes 21 in horizontal scanning period 3 is applied to the liquid crystal layer 30 between the pixel electrodes $11_{p+3}$ and the signal electrodes 21.

Subsequently, in horizontal scanning period 4, the gate signal $GL_{p+2}$ goes low and the gate signal $GL_{p+3}$ falls to the middle level. Since the gate signal $GL_{p+2}$ now has the low voltage level, the TFTs $12_{p+2}$ are non selected and the voltage between the pixel electrodes $11_{p+2}$ and the signal electrodes is kept as high as the voltage between the signal electrodes 21 and the pixel electrodes 11 in horizontal scanning period 2. The TFTs $12_{p+4}$ have their drains d connected to the pixel electrodes $11_{p+4}$ and their sources s connected to the gate line $G_{p+3}$ at the middle voltage level, respectively. Consequently, the potential at the pixel electrodes $11_{p+4}$ is set to be the reference potential, and a predetermined voltage corresponding to the potential at the signal electrodes 21 in horizontal scanning period 4 is applied to the liquid crystal layer 30 between the pixel electrodes $11_{p+4}$ and the signal electrodes 21.

Now take a look at the gate clock signals GCK1 through GCK8 next. Each of the gate clock signals GCK1 through GCK4 inverts its level into low or high every two horizontal scanning periods. The gate clock signal GCK2 has a phase lag of one horizontal scanning period with respect to the gate clock signal GCK1. The gate clock signal GCK3 has a phase lag of one horizontal scanning period with respect to the gate clock signal GCK2. And the gate clock signal GCK4 has a phase lag of one horizontal scanning period with respect to the gate clock signal GCK3. In this manner, the phases of these gate clock signals GCK1 through GCK4 are shifted from each other by one horizontal scanning period each.

Each of the gate clock signals GCK5 through GCK8 is a tri-state signal, of which the voltage changes from one of L (low), M (middle) and H (high) levels into another. The voltage of each of these gate clock signals GCK5 through GCK8 changes periodically every four horizontal scanning periods. That is to say, the voltage of each of these gate clock signals GCK5 through GCK8 repeats the same series of level changes (i.e., changes from one of low, middle and high levels into another) in a predetermined order. Specifically, in this example, each gate clock signal remains low for almost two horizontal scanning periods, goes high for approximately one horizontal scanning period, maintains the middle level for approximately one horizontal scanning period, and then goes low for approximately two horizontal scanning periods again.

The gate clock signal GCK6 has a phase lag of one horizontal scanning period with respect to the gate clock signal GCK5. The gate clock signal GCK7 has a phase lag of one horizontal scanning period with respect to the gate clock signal GCK6. And the gate clock signal GCK8 has a phase lag of one horizontal scanning period with respect to the gate clock signal GCK7. In this manner, the phases of these gate clock signals GCK5 through GCK8 are also shifted from each other by one horizontal scanning period each. As already described with reference to FIG. 9, when selected by the selection signal, each of the gate clock signals GCK5 through GCK8 is output as a gate signal GL.

Now take a look at the modules $15m_{p+2}$ and $15m_{p+3}$, for example. The stage section 15s of the module $15m_{p+2}$ generates a selection signal in response to the gate clock signal GCK2. The buffer section 15t generates a gate signal $GL_{p+2}$ based on the selection signal and the gate clock signal GCK6. When selected by the selection signal, the buffer section 15t outputs the gate clock signal GCK6 as the gate signal $GL_{p+2}$.

The stage section 15s of the module $15m_{p+3}$ generates a selection signal in response to the gate clock signal GCK3. The buffer section 15t generates a gate signal $GL_{p+3}$ based on the selection signal and the gate clock signal GCK7. When selected by the selection signal, the buffer section 15t outputs the gate clock signal GCK7 as the gate signal $GL_{p+3}$.

In the liquid crystal display device 100 of this embodiment, when the gate clock signals GCK1 and GCK5 rise, the gate clock signal GCK5 can have greater voltage amplitude than in the liquid crystal display device of the first embodiment described above. Consequently, the voltage level can be raised by bootstrap even more effectively and the gate signal can rise in an even shorter time.

In the foregoing description, the source s of each switching element 12 is electrically connected to the adjacent gate line G, and the potential on that gate line G is set to be the reference potential in order to set the potential at the pixel electrodes 11 to be the reference potential when the switching element 12 is turned ON. However, this is only an example of the present invention. Alternatively, the source s of each switching element 12 may be electrically connected to a gate line G which is located two or more rows away from the current one, and the potential on that gate line G may be set to be the reference potential in order to set the potential at the pixel electrodes 11 to be the reference potential when the switching element 12 is turned ON.

Optionally, even though its description is omitted to avoid redundancies, the gate driver 15 may include two gate drivers 15a and 15b which are arranged in two different areas 104a and 104b, respectively, as already described with reference to FIGS. 6 through 8.

Also, in the foregoing description, a gate signal is supposed to be generated in response to at least two of the eight gate clock signals GCK1 through GCK8. However, this is just an example of the present invention. The number of different gate clock signals does not have to be eight.

INDUSTRIAL APPLICABILITY

The present invention provides a liquid crystal display device which contributes to narrowing the frame area. Such a liquid crystal display device can be used particularly effectively in a device of a medium to small size such as an e-book, a cellphone or a smart phone.

REFERENCE SIGNS LIST 10 substrate
11 pixel electrode
12 switching element 15 gate driver
20 substrate
21 signal electrode
24 external connecting terminal section

The invention claimed is:

1. A liquid crystal display device comprising:
a first substrate which includes: a plurality of pixel electrodes that are arranged in rows and columns to form a matrix pattern; a plurality of gate lines, each of which runs in a row direction; and a plurality of switching elements, each of which includes a gate, a source and a drain, each of the plurality of switching elements having its drain electrically connected to an associated one of the pixel electrodes and its gate electrically connected to an associated one of the gate lines, each set of the switching elements that are arranged in the row direction having their sources electrically connected together;
a second substrate including a plurality of signal electrodes which are electrically independent of each other; and
a liquid crystal layer which is interposed between the first and second substrates,
wherein the first substrate further includes a gate driver which generates gate signals to be supplied to the gate lines, and
wherein the second substrate further includes an external connecting terminal section,
wherein a signal that has been input through the external connecting terminal section is supplied to the gate driver,
wherein the gate driver generates gate signals in response to a plurality of gate clock signals,
wherein the gate driver outputs some of the gate dock signals as the gate signals during a predetermined period, and
the plurality of gate clock signals include:
a first gate clock signal which inverts its level every two horizontal scanning periods;
a second gate clock signal of which the phase has shifted by one horizontal scanning period with respect to the first gate clock signal;
a third gate clock signal of which the phase has shifted by one horizontal scanning period with respect to the second gate clock signal;
a fourth gate clock signal of which the phase has shifted by one horizontal scanning period with respect to the third gate clock signal;
a fifth gate clock signal which repeats the same series of level changes from one of low, middle and high levels into another in a predetermined order every four horizontal scanning periods;
a sixth gate clock signal of which the phase has shifted by one horizontal scanning period with respect to the fifth gate clock signal;
a seventh gate clock signal of which the phase has shifted by one horizontal scanning period with respect to the sixth gate clock signal; and
an eighth gate clock signal of which the phase has shifted by one horizontal scanning period with respect to the seventh gate clock signal.

2. The liquid crystal display device of claim 1, wherein the gate driver generates gate signals, of which the level changes from one of low, middle and high levels into another, and
wherein each of the plurality of switching elements has its source electrically connected to another gate line, not its associated gate line.

3. The liquid crystal display device of claim 2, wherein each of the plurality of switching elements has its source electrically connected to a gate line which is adjacent to its associated gate line.

4. The liquid crystal display device of claim 1, wherein the second substrate further includes a source driver which supplies a video signal to the signal electrodes.

5. The liquid crystal display device of claim 1, wherein the first substrate has a display area and a frame area which surrounds the display area, and
wherein the gate driver includes first and second gate drivers which are respectively arranged in first and second areas of the frame area that are located on two opposite sides of the display area in the row direction.

6. The liquid crystal display device of claim 1, wherein the gate driver includes a plurality of gate driver modules which generate respective gate signals to be supplied to the plurality of gate lines.

7. The liquid crystal display device of claim 6, wherein each of the plurality of gate driver modules includes:
a stage section, to/from which a signal is input or output from/to an adjacent one of the gate driver modules; and
a buffer section.

8. The liquid crystal display device of claim 7, wherein the stage section includes a bootstrap capacitor, and
wherein the stage section outputs a signal to the buffer section through a line which is connected to the bootstrap capacitor.

9. The liquid crystal display device of claim 1, wherein the first gate clock signal rises synchronously with the fifth gate clock signal.

10. The liquid crystal display device of claim 1, wherein before the fifth gate clock signal rises from the middle level to the high level, the sixth gate clock signal rises from the low level to the middle level.

11. The liquid crystal display device of claim 1, wherein after the fifth gate clock signal has fallen from the high level to the low level, the sixth gate clock signal rises from the middle level to the high level.

12. The liquid crystal display device of claim 1, wherein in each of the fifth, sixth, seventh and eighth gate clock signals, the potential difference between the high and middle levels is greater than the sum of a maximum potential difference of the signal electrodes and a threshold voltage of the switching elements.

13. The liquid crystal display device of claim 1, wherein in each of the fifth, sixth, seventh and eighth gate clock signals, the potential difference between the middle and low levels is greater than the difference between a maximum potential difference of the signal electrodes and a threshold voltage of the switching elements.

14. The liquid crystal display device of claim 1, wherein each of the fifth, sixth, seventh and eighth gate clock signals changes their level in the order of low, middle and high levels.

15. The liquid crystal display device of claim 1, wherein each of the fifth, sixth, seventh and eighth gate clock signals changes their level in the order of low, high and middle levels.

16. The liquid crystal display device of claim 1, wherein each of the plurality of switching elements includes an oxide semiconductor layer.

17. The liquid crystal display device of claim 16, wherein the oxide semiconductor layer includes In, Ga and Zn.

* * * * *